US008503026B2

(12) United States Patent
Kaechi

(10) Patent No.: US 8,503,026 B2
(45) Date of Patent: Aug. 6, 2013

(54) PRINTING APPARATUS AND PRINTING CONTROL METHOD

(75) Inventor: Shuya Kaechi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 773 days.

(21) Appl. No.: 12/706,310

(22) Filed: Feb. 16, 2010

(65) Prior Publication Data

US 2010/0209167 A1 Aug. 19, 2010

(30) Foreign Application Priority Data

Feb. 18, 2009 (JP) ................................. 2009-035811

(51) Int. Cl.
*G06F 3/12* (2006.01)

(52) U.S. Cl.
USPC ............. 358/1.9; 358/1.2; 358/1.4; 358/1.18; 347/172

(58) Field of Classification Search
USPC ................... 358/1.1, 1.2, 1.4, 1.6, 1.11, 1.18, 358/448, 452, 453; 347/171, 172
See application file for complete search history.

(56) References Cited

U.S. PATENT DOCUMENTS

| | | | | |
|---|---|---|---|---|
| 5,064,304 | A * | 11/1991 | Hosokawa et al. | 400/216.1 |
| 6,222,568 | B1 * | 4/2001 | Mano et al. | 347/171 |
| 2006/0239744 | A1 * | 10/2006 | Hideaki | 400/249 |
| 2007/0041768 | A1 * | 2/2007 | Kawada | 400/240 |
| 2007/0071319 | A1 | 3/2007 | Fukushima | |
| 2011/0228236 | A1 * | 9/2011 | Yanagita | 355/18 |

FOREIGN PATENT DOCUMENTS

| | | | |
|---|---|---|---|
| JP | 09085975 | A * | 3/1997 |
| JP | 2001-309161 | A | 11/2001 |
| JP | 2004-82610 | | 3/2004 |
| JP | 2005-103809 | A | 4/2005 |
| JP | 2007-087262 | A | 4/2007 |

* cited by examiner

*Primary Examiner* — Kimberly A Williams
(74) *Attorney, Agent, or Firm* — Fitzpatrick, Cella, Harper & Scinto

(57) ABSTRACT

A printing method of printing an image corresponding to one frame by using inks of a plurality of colors applied to an ink ribbon allows a printing apparatus to print one image on continuous paper by using inks corresponding to a plurality of ink surfaces. When printing one print image by using a plurality of ink surfaces on an ink ribbon, the printing apparatus sets an area in the print image to be printed by one ink surface on the ink ribbon, by dividing the print image. The printing apparatus then prints one print image by using a plurality of ink surfaces on the ink ribbon based on the set area.

15 Claims, 22 Drawing Sheets

PRINTING APPARATUS AND PRINTING CONTROL METHOD

FIELD OF THE INVENTION

The present invention relates to a printing apparatus and a printing control method.

DESCRIPTION OF THE RELATED ART

Conventional printing apparatuses include a thermal transfer printer which prints by thermally transferring ink applied to an ink ribbon onto a printing medium such as paper. For example, a home laboratory is known as one that uses this printing apparatus. The home laboratory creates photographs by printing images in image data obtained by a digital still camera or the like or image data processed by a PC (Personal Computer) or the like.

The above printing apparatus will be outlined with reference to FIGS. 18A and 18B. As shown in FIG. 18A, in a printing portion, paper 100 is conveyed while being gripped by grip rollers 153. A thermal head 155 thermally transfers ink of an ink ribbon 103 onto the paper 100 while it is conveyed, thereby printing. Note that if the paper 100 is roll paper, a cutting unit 154 cuts the paper 100 in, for example, the length of L size. A supply bobbin 150 supplies the ink ribbon 103, and a take-up bobbin 151 takes it up.

As shown in FIG. 18B, the ink ribbon 103 is formed by coating a ribbon base film 105 with a dye-receiving layer 104. The paper 100 is formed to have, on a paper base film 102, an absorbing layer 101 onto which the dye of the ink ribbon 103 is transferred. At the time of printing, a platen roller 152 and the thermal head 155 contact the ink ribbon 103 and the paper 100 in an overlaid state. The thermal head 155 heats the contacted portion while scanning the paper 100 and the ink ribbon 103 to sublimate ink of the ink ribbon 103 and transfer the ink onto the paper 100, thereby forming an image.

The size arrangement of an ink ribbon and paper will be described next with reference to FIG. 19. An ink ribbon I1 shown in FIG. 19 is an ink ribbon for printing on paper P1 having a width Wa in the main scanning direction and a length La in the sub-scanning direction. The ink ribbon has the same width as the width Wa of the paper P1. The ink ribbon I1 has ink regions of yellow, magenta, and cyan to form the respective colors on the paper P1. The ink ribbon I1 also has an overcoat region following each set of ink regions to form a protection layer on the paper P1 after printing. The ink ribbon I1 has the above four types of ink regions repeatedly formed in the length La corresponding to the size of the paper P1. That is, the ink ribbon I1 is specified in advance to print on the paper P1 while exactly covering one surface on the paper P1 by using four ink regions including ink regions of the respective colors and an overcoat region each having the width Wa and the length La. The Ink ribbon I1 has monochromatic ink regions with a specified ink region size, which are repeatedly formed in a regular color sequence (in the order of yellow, magenta, cyan, and overcoat) in the sub-scanning direction. Although the size of the paper P1 is equal to that of each ink region according to the above description, each ink surface can have a size larger than the paper size. Any ink region size can be set as long as it allows to transfer ink onto a print area on the paper P1.

When printing by using the above ink ribbon, the size of an image that can be printed by using an ink ribbon with a set of yellow, magenta, cyan, and overcoat regions is determined by the size of each ink region. Therefore, for example, it is not possible to print an image having a size larger than L size by using an L-size ink ribbon.

SUMMARY OF THE INVENTION

The present invention has been made to solve such a problem. The present invention provides a printing apparatus and printing control method which can print, on paper, an image longer than each ink surface on an ink ribbon by performing dividing print, that is, printing a plurality of number of times for one image, with the printable size of each ink surface on the ink ribbon being a unit.

The present invention in its first aspect provides a printing apparatus comprising: a printing unit configured to print a print image on a print medium using at least one set of color inks, the set of color inks includes a plurality of color inks and the set of color inks is repeatedly arranged on an ink ribbon; a determination unit configured to, in case where one print image is printed by using a plurality of sets of color inks, determine an area in the print image, which is printed by one set of color inks, by dividing the print image to a size not larger than the printable size of one set of color inks; and a control unit configured to control the printing unit to print the print image by using the plurality of sets of color inks based on the area determined by the determination unit, wherein the determination unit divides the print image into areas corresponding to a minimum number of sets of color inks which are required for printing the print image.

Further features of the present invention will become apparent from the following description of exemplary embodiments (with reference to the attached drawings).

DESCRIPTION OF THE EMBODIMENTS

An embodiment of the present invention will be described below with reference to the accompanying drawings. However, the present invention is not limited to the following embodiment. The embodiment of the present invention is the most preferable embodiment of the invention, but does not limit the scope of the invention. For example, the dimensions and shapes of components exemplified in the embodiment to be described below and the relative disposition of the components can be properly changed according to the arrangement of an apparatus to which the present invention is applied and various conditions. The present invention is not limited to these exemplifications.

A printing apparatus according to this embodiment uses an ink ribbon of which surface is divided into a plurality of ink regions of the same size in its longitudinal direction and a plurality of colors of inks are provided on the surface. On each of the ink regions, one of a set of color inks, such as magenta ink, yellow ink and cyan ink, is applied. The color inks can include an overcoat ink if it is used. In the following descriptions, an "ink surface" means an area consists of consecutive ink regions including one set of the color inks. Namely, if four colors (for example, C, M, Y, and overcoat) are used, four consecutive regions including C, M, Y, and overcoat inks constitute an "ink surface". Since each of the ink regions has the same size, the maximum printable size by using one ink surface equals to the size of an ink region. Therefore, in the following descriptions, the size of the ink region may sometimes be referred to as "a printable size". If a print image is larger than the printable size, the printing apparatus uses a plurality of ink surfaces to print the print image. In such a case, the printing apparatus divides the print image into a plurality of portions each having a size less than or equal to the printable size, and uses one ink surface to print one portion. Regarding how the printing apparatus divide the large print image is described later in detail.

A method of dividing image data to be printed and a printing method using divided image data in the printing apparatus according to this embodiment will be described. That is, in the dividing method to be described below, when image data is divided, and images printed using the divided image data are joined together in the long side direction, the obtained image becomes one continuous image without any margins. When using continuous paper such as roll paper, in particular, it is possible to print on one sheet of paper by using a plurality of ink surfaces on an ink ribbon. Dividing print can therefore obtain one printed matter in a paper size larger than the normal size.

Figure 19:
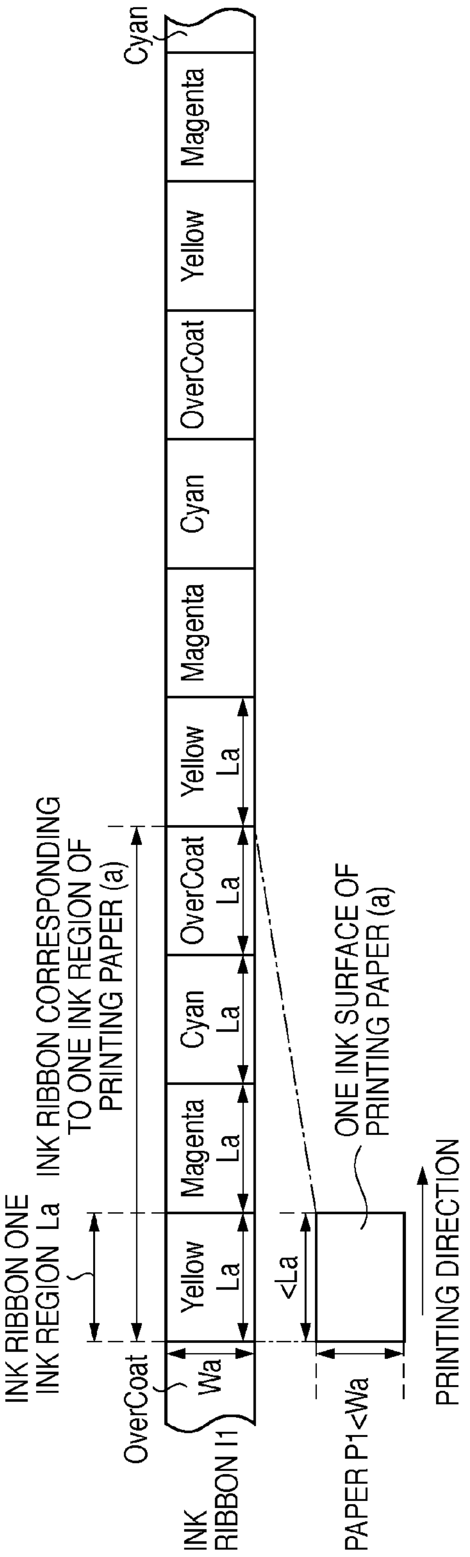
F I G. 19 PRIOR ART
FIG. 19 is a conceptual view showing the conventional relationship between paper and an ink ribbon.

Like the ink ribbon exemplified in FIG. 19, an ink ribbon in this embodiment has ink regions of yellow, magenta, and cyan for forming colors on paper, and has an overcoat region following each set of ink regions to form a protection layer on paper after printing. In addition, the ink ribbon has the above four types of ink regions repeatedly formed in a predetermined length corresponding to the size of paper. On the ink ribbon, therefore, monochromatic ink regions each having a predetermined size are repeatedly formed in a regular color sequence in the scanning direction.

Assume that in the following description, W×L represents a size in which printing can be performed using one ink surface on an ink ribbon. In this case, the ink ribbon has ink regions, each having a size equal to or slightly larger than W×L, arranged in the order of the respective colors.

Figure 1:
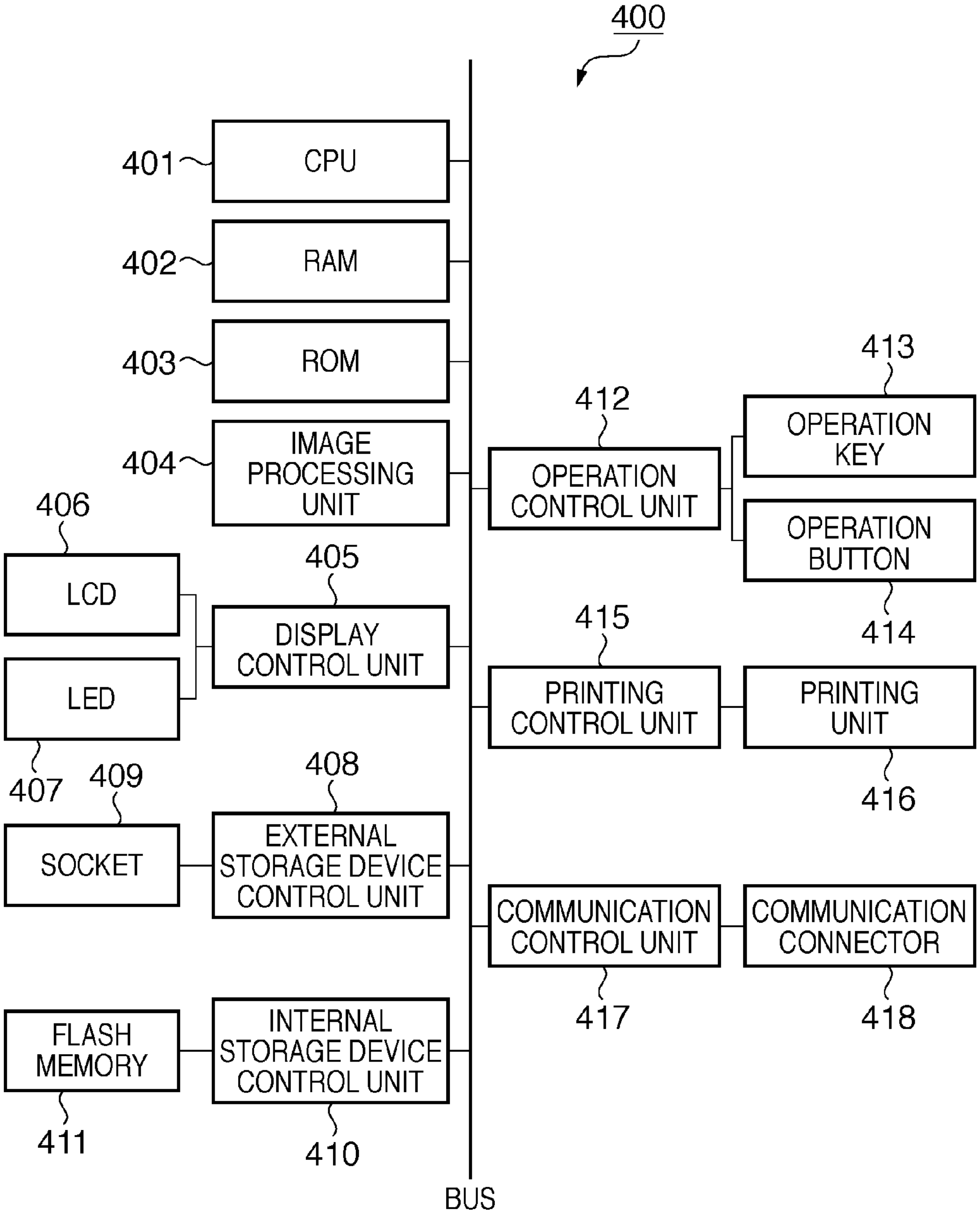
FIG. 1 is a block diagram exemplifying the arrangement of a printing apparatus according to an embodiment.

FIG. 1 is a block diagram exemplifying the arrangement of a printing apparatus 400 according to this embodiment. As shown in FIG. 1, a CPU 401 (Central Processing Unit) centrally controls the overall printing apparatus 400. A RAM 402 (Random Access Memory) provides a work area for the CPU 401. A ROM 403 (Read Only Memory) stores program data including processing procedures performed by the CPU 401 and various setting information such as the printable size of each ink surface on an ink ribbon of a printing unit 416. The ROM 403 can be a reprogrammable nonvolatile memory such as a flash memory.

Note that the ROM 403 may store pieces of setting information such as the printable sizes of ink surfaces for the respective types of ink ribbons set in the printing unit 416. In this case, the CPU 401 can acquire pieces of setting information corresponding to the respective types of ink ribbons by referring to the ROM 403 upon detecting the types of ink ribbons set in the printing unit 416 by using a sensor or the like.

An image processing unit 404 is, for example, a DSP (Digital Signal Processor) to perform various types of image processing under the control of the CPU 401. The image processing unit 404 is used to convert, for example, digital image data into data which can be displayed on the screen. A display control unit 405 controls display output from an LCD (Liquid Crystal Display) 406 and LED (Light Emitting Diode) 407 under the control of the CPU 401. The LCD 406 displays various types of images on the screen. The LED 407 is used as an indicator to indicate a processed state.

An external storage device control unit 408 controls write and read of data in and from the external storage device connected to the printing apparatus 400. A socket 409 is connected to an external storage device such as Compact Flash® or Memory Stick®. The external storage device control unit 408 therefore controls write of data in the external storage device connected to the socket 409 and read of data stored in the external storage device.

An internal storage device control unit 410 controls read of data stored in a storage medium such as a flash memory 411 provided in the printing apparatus 400 and write of data in the storage medium. An operation control unit 412 controls the acceptance of operation information from buttons and the like which receive various operations from the user. For example, the operation control unit 412 accepts operation information from an operation key 413 and an operation button 414 and outputs it to the CPU 401.

Figure 18A:
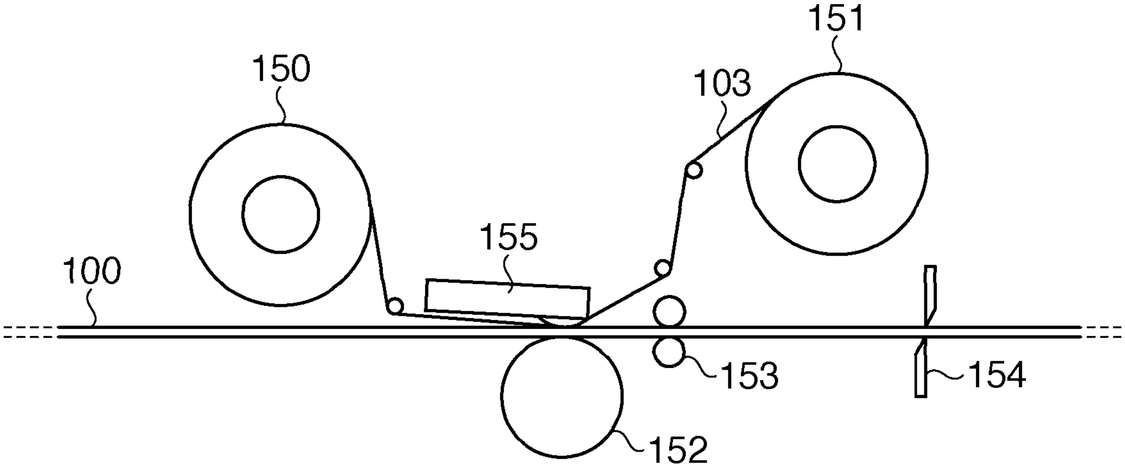
FIG. 18A PRIOR ART
FIG. 18A is a schematic view of a printing unit in a printing apparatus using a conventional ink ribbon.
Figure 18B:
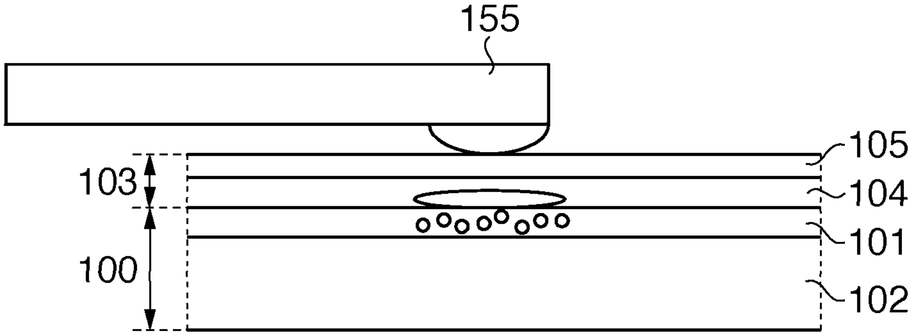
FIG. 18B PRIOR ART
FIG. 18B is a schematic view of a portion where ink of a conventional ink ribbon is transferred onto printing paper.

A printing control unit 415 controls printing on paper using an ink ribbon in the printing unit 416. The printing unit 416 is a thermal sublimation type printing unit which transfers ink of the ink ribbon onto paper. More specifically, the printing unit 416 has the same arrangement as that shown in FIGS. 18A and 18B, and prints on paper by transferring ink of an ink ribbon onto paper. The printing unit 416 also includes an sensor (not shown) to detect the type of set ink ribbon or the remaining amount of unused ink ribbon and output the resultant data to the CPU 401. The CPU 401 calculates the remaining number of times of printing, with the printable size of each ink surface being a unit, based on an output from the sensor. In addition, the printing unit 416 includes a sensor (not shown) to detect the number of sheets of paper stacked on a paper feed tray (not shown), the remaining amount of unused paper roll, or the like and output the resultant data to the CPU 401. A communication control unit 417 controls communication with an external device communicatively connected thereto via a communication connector 418 using a USB, IEEE1394, or the like.

The printing apparatus 400 inputs image data to be printed by the printing unit 416 from the external device connected via the communication connector 418, the external storage device connected to the socket 409, the flash memory 411 provided in the printing apparatus 400, or the like.

Figure 2:
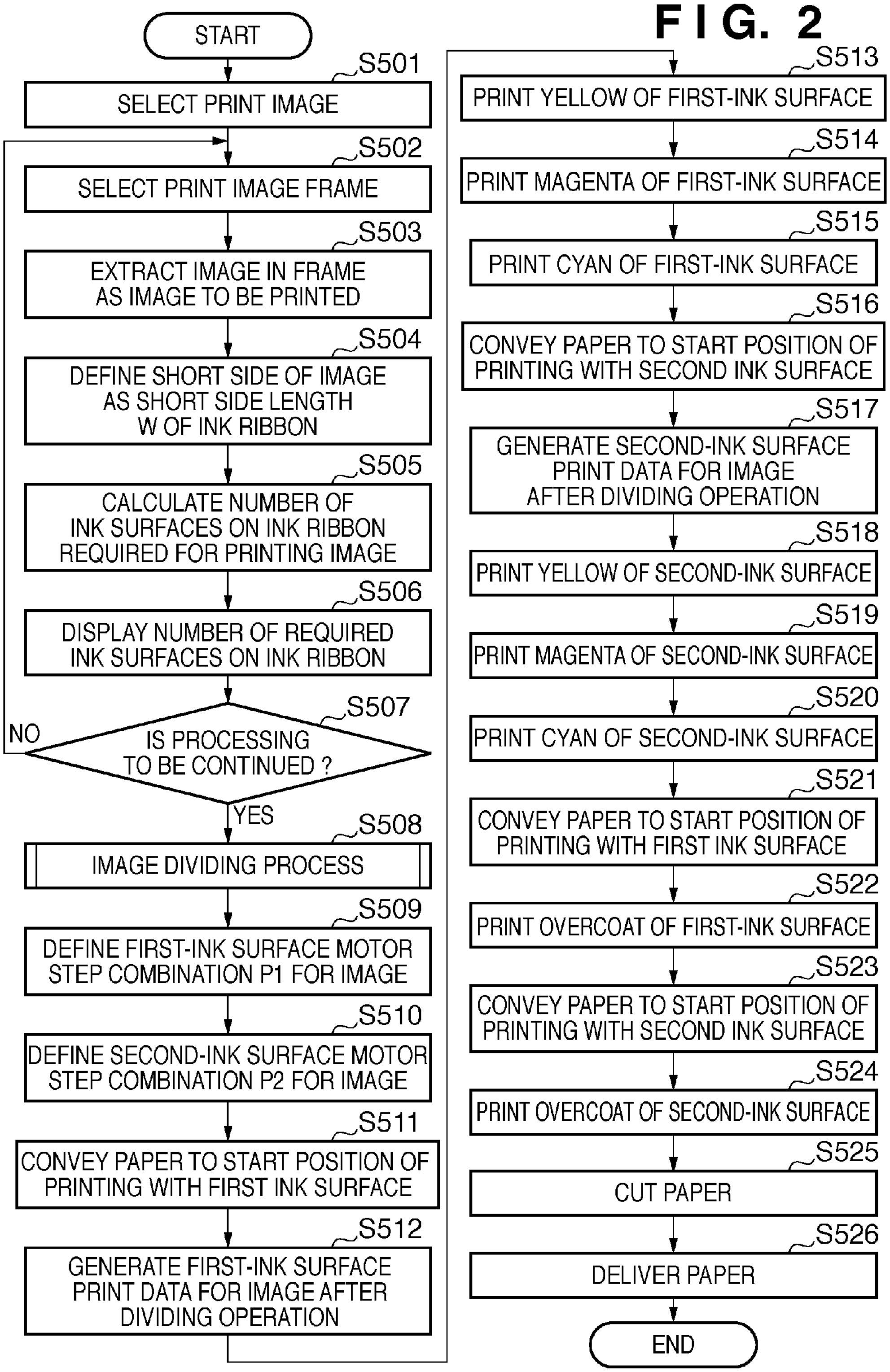
FIG. 2 is a flowchart showing a printing process in the printing apparatus according to the embodiment.

FIG. 2 is a flowchart showing a printing process in the printing apparatus 400 according to this embodiment. More specifically, the flowchart of FIG. 2 indicates the process in which the CPU 401 sets, with a frame, an area in which printing is to be performed, after the user selects image data, and repeatedly prints a plurality of number of times to print the area surrounded by the frame on paper under the above condition, with the printable size of each ink surface on the ink ribbon being a unit.

Note that in the printing process to be exemplified below, two sets of ink surfaces on an ink ribbon are used, with four types of ink regions on the ink ribbon being one set, and printing is repeated twice by using one set of ink regions on the ink ribbon. If printing is required to be performed only once, a general printing process can be performed. For this reason, assume that in a printing process in this embodiment, printing is performed twice or more with the printable size of each ink surface being a unit.

As shown in FIG. 2, in step S501, the CPU 401 gets the LCD 406 to display image data to be printed which is selected in accordance with an instruction from the user, which the operation control unit 412 has accepted from the operation key 413 or the operation button 414. Assume that the external storage device connected to the socket 409 or the flash memory 411 stores the image data selected in accordance with this instruction from the user.

In step S502, the CPU 401 gets the display control unit 405 to display an operation window on the LCD 406 so as to make the user set a print image frame having an arbitrary aspect ratio via the user interface to accept an instruction from the user via the operation key 413, the operation button 414, or the like. The print image frame is a frame indicating an image area, of an image represented by the image data selected in step S501, which is to be printed.

Figure 3:
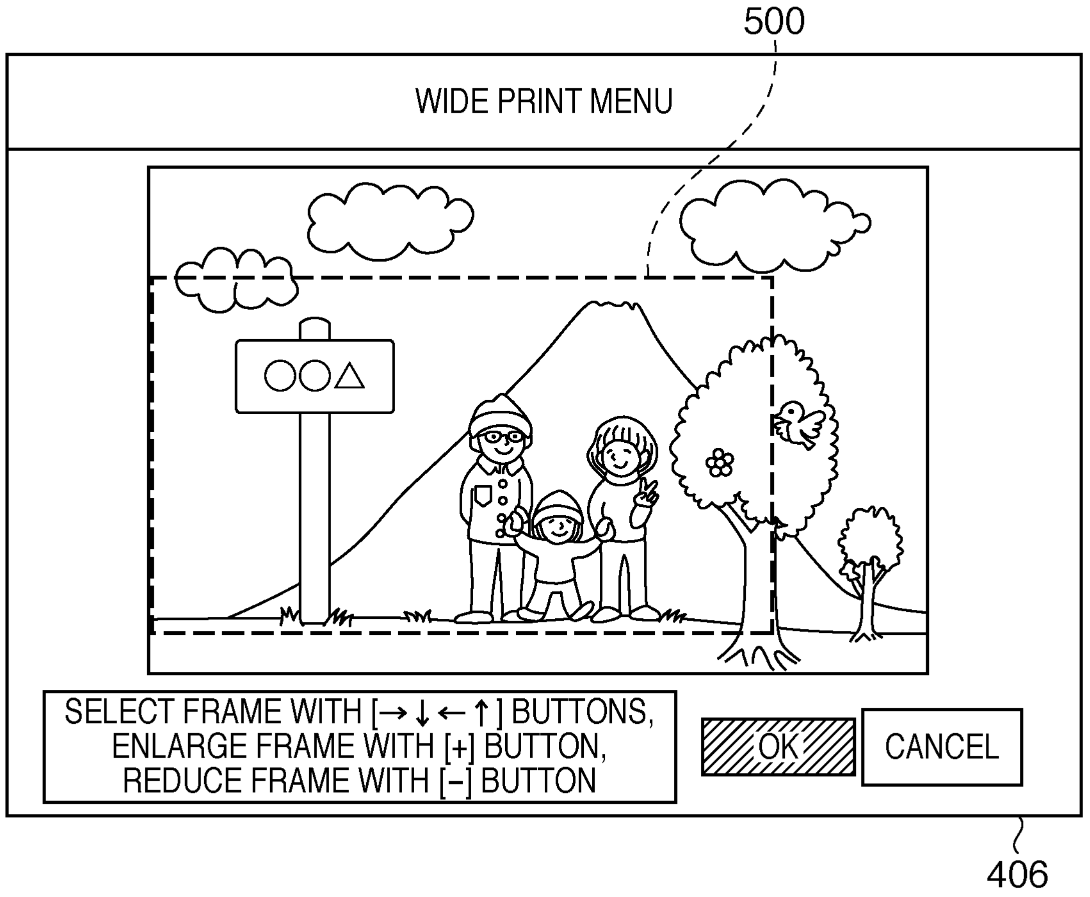
FIG. 3 is a view showing an example of display of a user interface at the time of setting a print image frame having an arbitrary aspect ratio.

An example of display of a graphical user interface with which the user sets a print image frame in step S502 will be described with reference to FIG. 3. As shown in FIG. 3, the LCD 406 displays the image selected in step S501. The user sets a print image frame 500 having an arbitrary aspect ratio for the image by operating the operation key 413 or the operation button 414.

In step S503, the CPU 401 extracts an image area in the selected print image frame 500 as an image to be printed. In step S504, the CPU 401 defines the print size of an image to be printed in the short side direction as a short side length W of each ink surface on the ink ribbon set in the printing unit 416. In step S505, the CPU 401 calculates the number of ink surfaces (the number of sets) on an ink ribbon required for printing by dividing the print size of an image to be printed, whose length in the short side direction is defined as the short side length W in step S504, by the value obtained by converting the length in the long side direction into a long side length L of each ink surface, thereby estimating the length of paper. In step S505, the CPU 401 calculates how many times printing needs to be performed with the printable size of each ink surface being a unit. In this case, the number of ink surfaces on an ink ribbon required for printing is the number of sets of ink regions on the ink ribbon required for printing, with ink regions of yellow, magenta, cyan, and overcoat being one set.

Figure 4A:
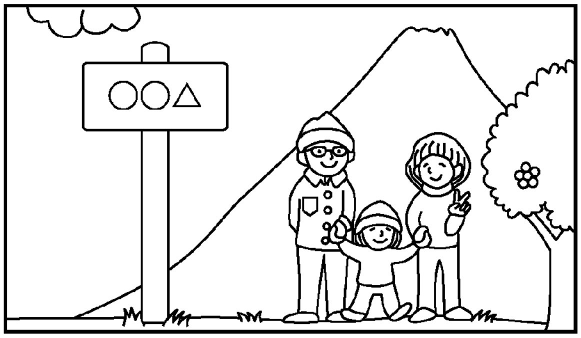
FIG. 4A is a conceptual view exemplifying an image to be printed.
Figure 4B:
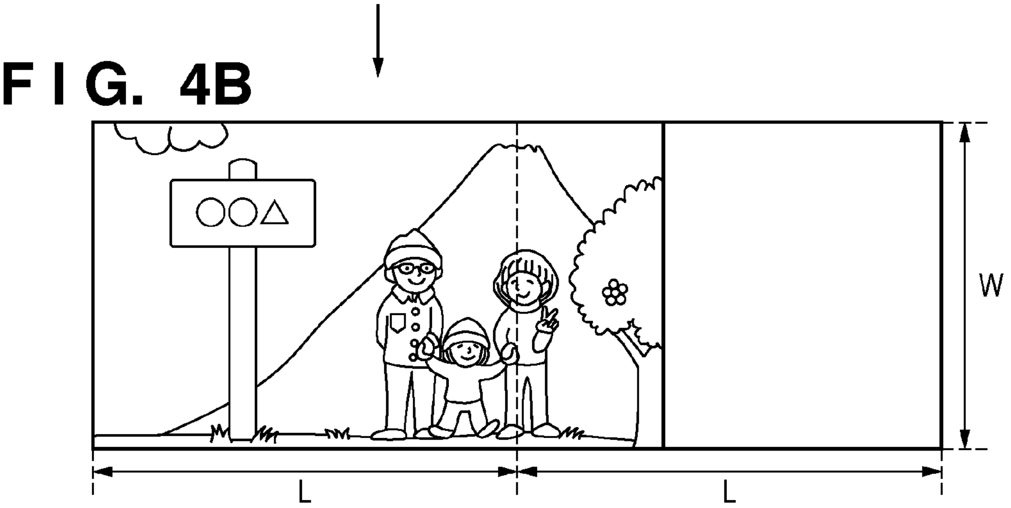
FIG. 4B is a conceptual view exemplifying the estimation of the number of ink surfaces on an ink ribbon required for printing and the length of paper from the image to be printed.

Estimation of the number of ink surfaces on an ink ribbon required for printing of an image to be printed and of the length of paper will be described below with reference to FIGS. 4A and 4B. The length of the image to be printed, like that shown in FIG. 4A, which is extracted in step S503, in the short side direction is converted into a length matching the short side length W of each ink surface. This length conversion in the short side direction is performed while the aspect ratio of an image to be printed remains unchanged. As shown in FIG. 4B, it is then possible to calculate the number of ink surfaces on the ink ribbon required for printing and the length of paper by dividing the image to be printed after length conversion in the short side direction by the long side length W of each ink surface. That is, in step S505, the CPU 401 calculates the number of ink surfaces on the ink ribbon and the length of the paper from the size of the image to be printed and the printable size of each ink surface, with the aspect ratio of the image to be printed remaining unchanged, when printing the image while matching the short side of the image to be printed with the width of each ink surface in the short side direction. In the case shown in FIGS. 4A and 4B, since the size of the image to be printed corresponds to the printable sizes of one and ⅓ ink surface, an ink ribbon corresponding to two ink surfaces and paper corresponding to ⅓ ink surface are required for printing.

Figure 5A:
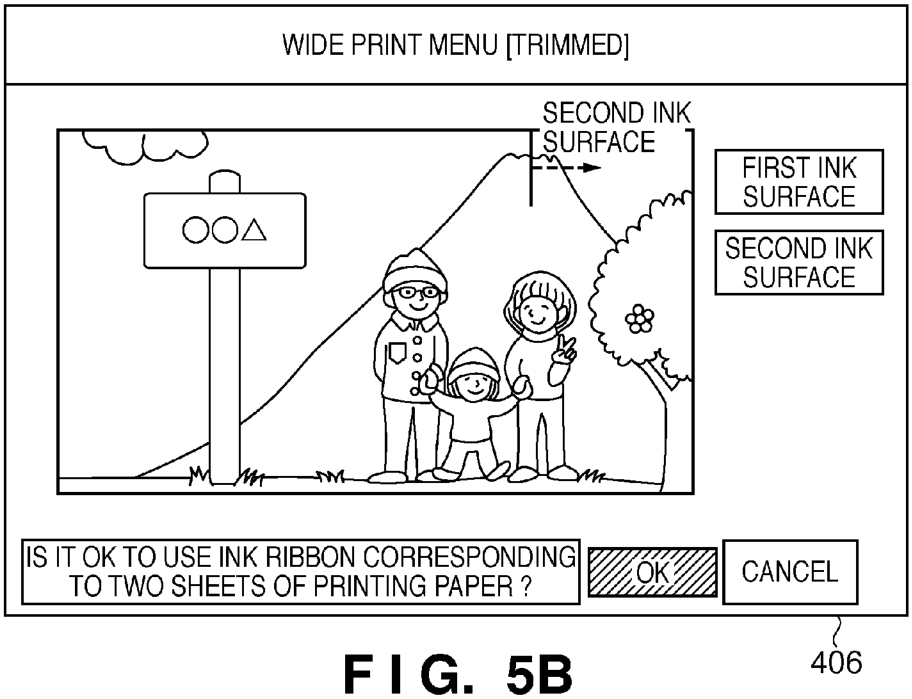
FIGS. 5A and 5B are views showing examples of display of a user interface which indicates the number of ink surfaces on the ink ribbon required for printing.

In step S506, the CPU 401 gets the display control unit 405 to display the number of ink surfaces on the ink ribbon required for printing, which is estimated in step S505, on a graphical user interface on the LCD 406. More specifically, as shown in FIG. 5A, the graphical user interface displays the entire image to be printed which is obtained by trimming the selected image data. In addition, the graphical user interface displays a delimiting line corresponding to the printable size of each ink surface on the ink ribbon in a superimposed state with respect to the image to be printed, and also displays the number of ink surfaces on the ink ribbon to print on the same window.

In step S507, the CPU 401 gets the operation control unit 412 to accept an operation instruction to continue or not to continue the processing from the user via the operation key 413 or the operation button 414, and determines in accordance with the operation instruction whether to continue the processing. If it is determined in step S507 that the processing is to be continued, the process advances to step S508 in which the CPU 401 gets the image processing unit 404 to perform an image dividing process. If it is determined in step S507 that the processing is not to be continued, the process returns to step S502 in which the CPU 401 makes the user re-set the print image frame 500.

Figure 5B:
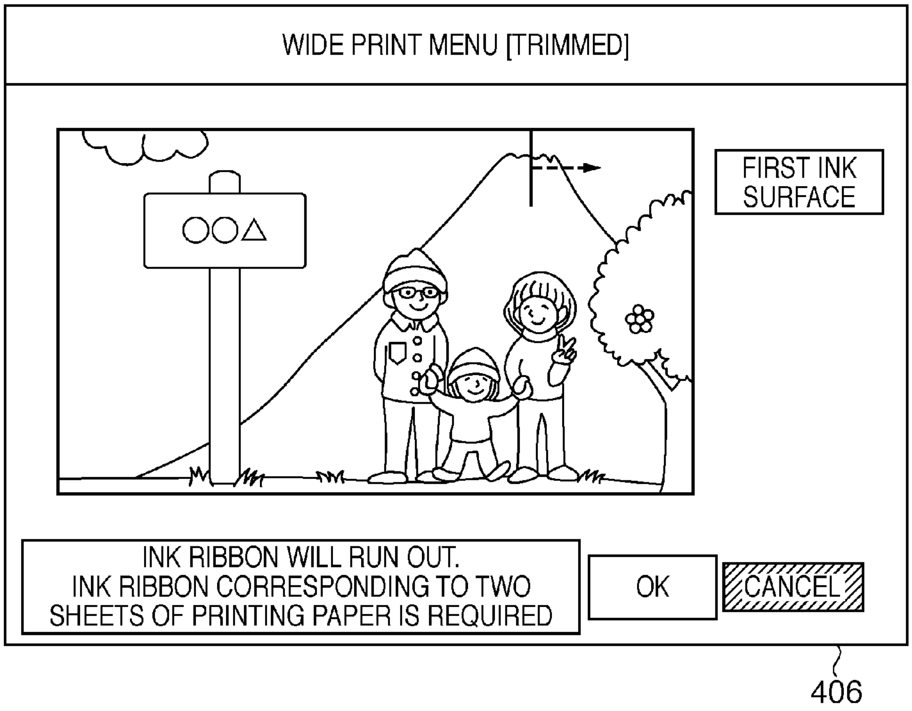

Note that if the number of ink surfaces on the ink ribbon and the length of the paper which are estimated in step S505 exceed the remaining number of unused ink surfaces on the ink ribbon set in the printing unit 416 and the remaining length of unused paper, the CPU 401 can also determine in step S507 that the processing is not to be continued. In this case, the CPU 401 gets the display control unit 405 to display a warning indicating, for example, a shortage of ink ribbon on the graphical user interface indicating the number of ink surfaces on the ink ribbon required for printing, which is displayed on the LCD 406, as shown in FIG. 5B, thereby displaying information prompting to re-set an image to be printed.

Figure 6A:
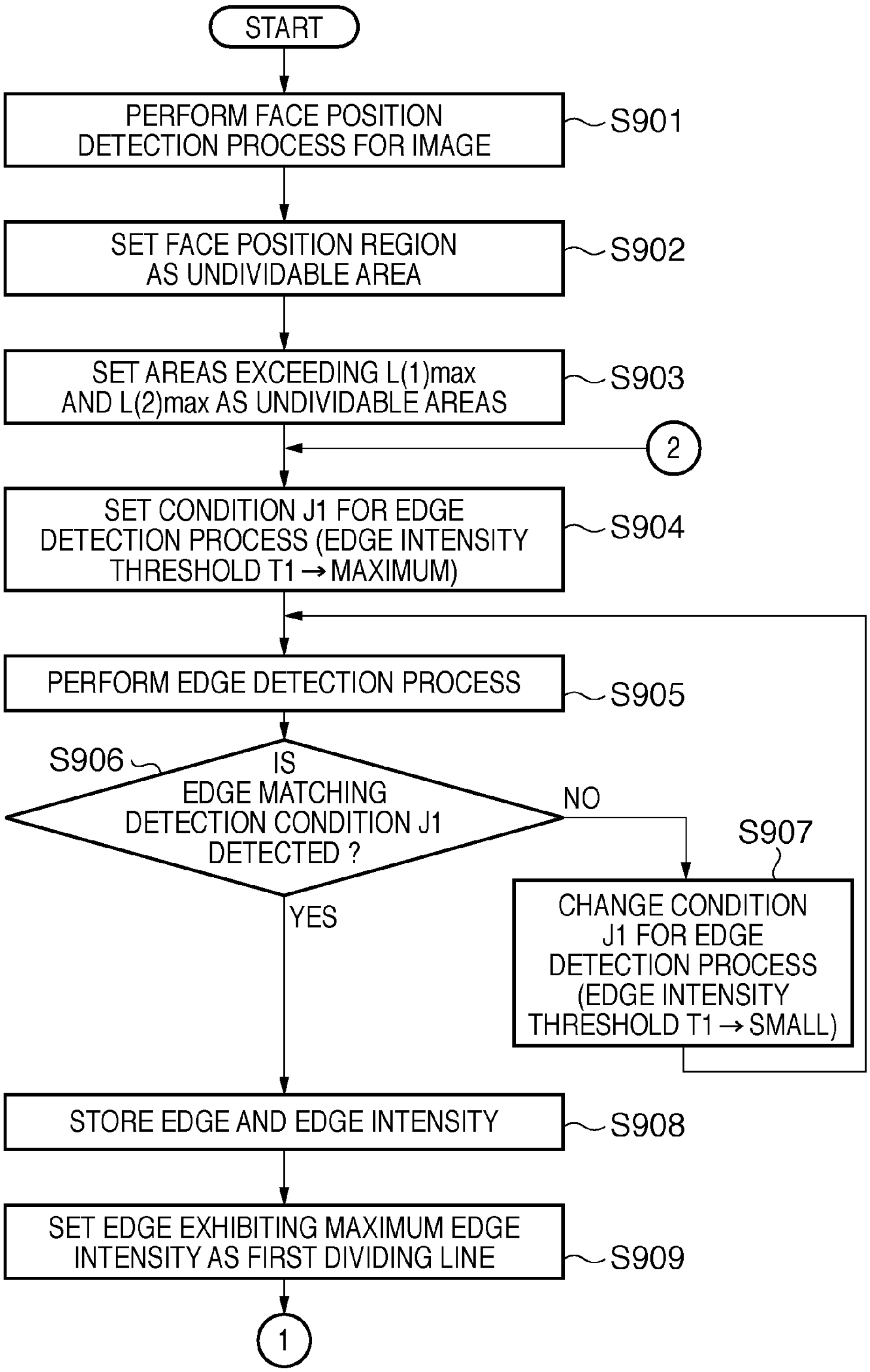
FIGS. 6A and 6B are flowcharts showing an image dividing process according to the embodiment of the present invention.
Figure 6B:
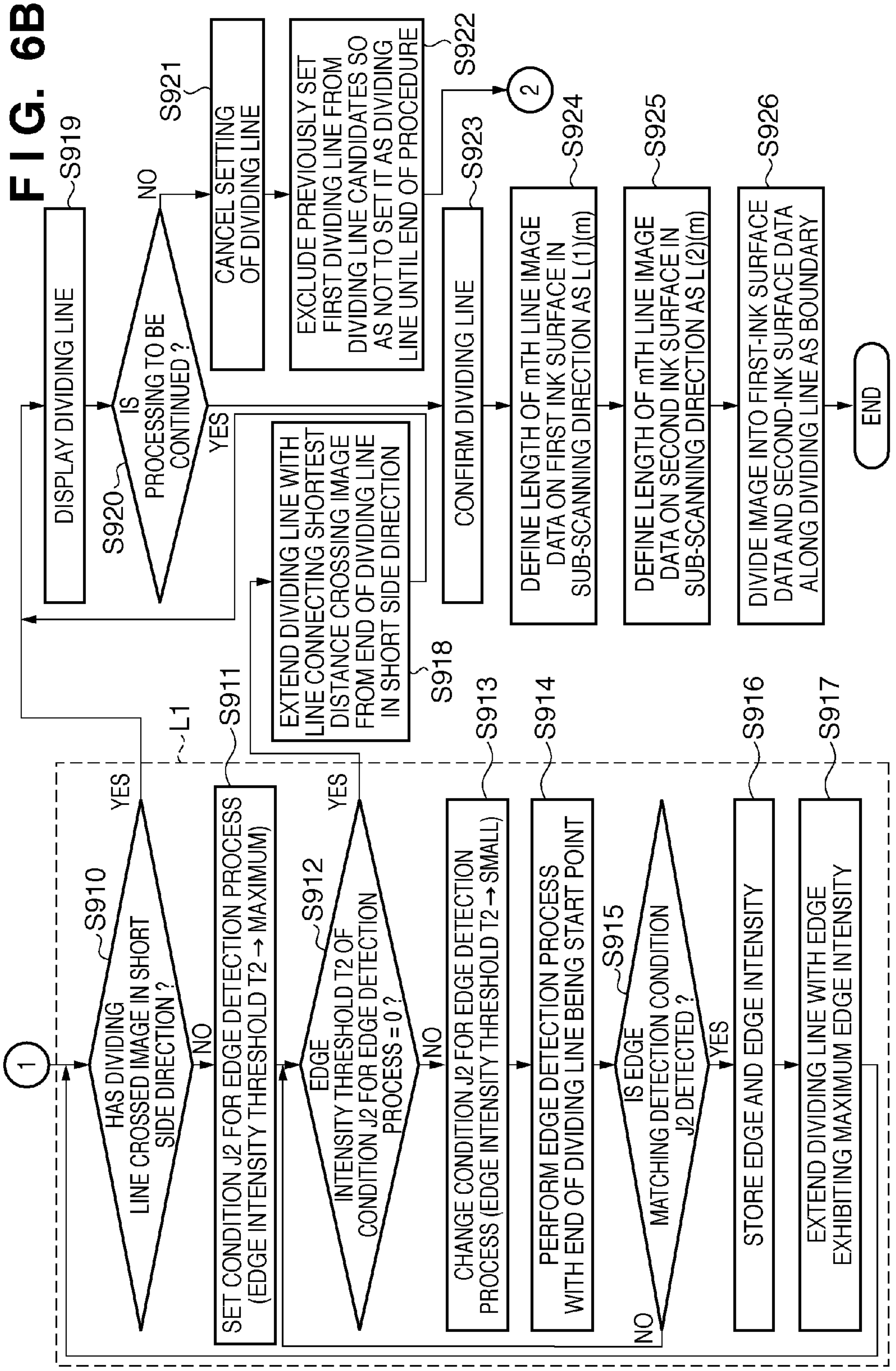

The contents of an image dividing process performed in step S508 will be described with reference to FIGS. 6A, 6B and 7A to 7H. FIGS. 6A and 6B are flowcharts showing the image dividing process. FIGS. 7A to 7H are conceptual views exemplifying how a dividing line is set on an image in an image dividing process.

Figure 7A:
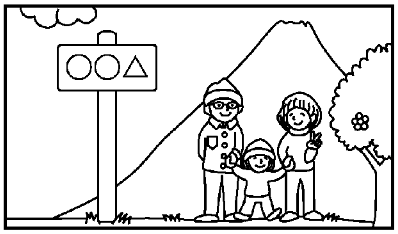
FIGS. 7A to 7H are conceptual views exemplifying how to set a dividing line on an image in an image dividing process.
Figure 7B:
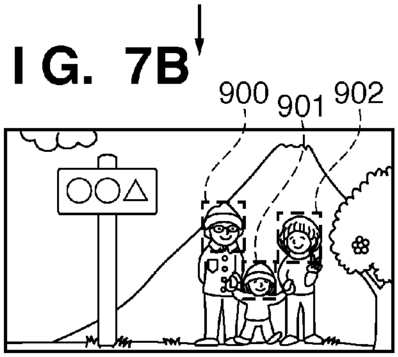

As shown in FIG. 6A, upon starting an image dividing process, the CPU 401 gets the image processing unit 404 to perform a face position detection process for an image to be processed (S901). FIG. 7A shows the image to be printed before face position detection. FIG. 7B shows the image to be printed after face position detection. In step S901, the CPU 401 gets the image processing unit 404 to detect the face regions of persons from the image to be printed. As shown in FIG. 7B, the CPU 401 then sets frames 900, 901, and 902 on the detected face regions. In this embodiment, the faces of three persons are recognized as the frames 900, 901, and 902.

As a method of detecting the face regions of persons in a face position detection process, a known technique can be used. Since this method is not directly relevant to the present invention, a detailed description of it will be omitted. Note that known face detection techniques include a technique based on learning using a neural network and a technique of finding a region having a characteristic shape such as an eye, a nose or a mouth from an image by using template matching, and determining the region as a face if the similarity is high. In addition, many techniques have been proposed, including a technique of detecting an image feature amount such as the color of a skin or an eye shape, and using statistical analysis. In general, a plurality of such techniques are combined to improve the detection accuracy of face regions.

Figure 7C:
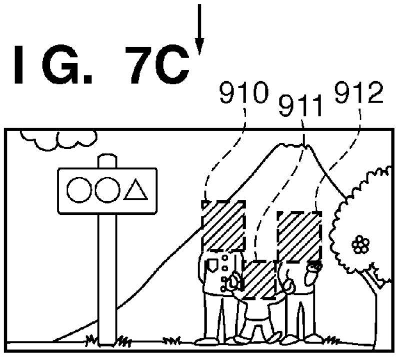

The CPU 401 then sets the face regions detected in step S901 as undividable areas in step S902. FIG. 7C shows the image to be printed after the face regions are set as undividable areas. As shown in FIG. 7C, in this embodiment, undividable areas 910, 911, and 912 are so set as to cover the face regions of the three persons. In the case shown in FIG. 7C, the undividable areas are rectangular face regions. However, the shapes of undividable areas are not specifically limited to rectangular shapes. In setting undividable areas, for example, it is possible to detect elements other than face regions and set undividable areas so as to cover the elements.

Figure 7D:
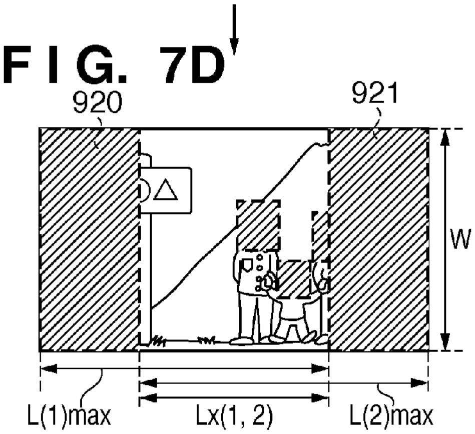

As shown in FIG. 7D, the CPU 401 then converts the length of the image to be printed in the long side direction into the long side length L of each ink surface. The CPU 401 places surfaces each having the printable size of ink surface on the ink ribbon from the two ends of the image to be printed so as to produce no gap in the long side direction. That is, the CPU 401 places surfaces each having the printable size of ink surface on the ink ribbon from the two ends of the image to be printed until an area is produced in which the surfaces each having the printable size of ink surface on the ink ribbon overlap each other. The image to be printed which is exemplified in this embodiment requires ink surfaces corresponding to the printable sizes of one and ⅓ ink surface. Therefore, surfaces each having the printable size of ink surface are placed from the two ends one by one.

The CPU 401 sets the maximum length of the first surface area (the area placed from the left end) as L(1)max, and the second surface area (the area placed from the right end) as L(2)max on the surfaces each having the printable size of ink surface which are placed side by side on the image to be printed. The CPU 401 then sets an area Lx(1, 2) as a dividable area, in which L(1)max and L(2)max overlap each other. At this time, if undividable areas are set in advance in step S902 or the like, the CPU 401 sets a dividable area so as to avoid the undividable areas. The CPU 401 then sets an area L(1)max-Lx(1, 2) and an area L(2)max-Lx(1, 2) as undividable areas 920 and 921, respectively (S903). Therefore, a dividing line on the image to be printed is set within the range of the dividable area Lx(1, 2).

In step S904, the CPU 401 sets a condition J1 for an edge detection process. In step S904, the CPU 401 sets the condition J1: edge intensity threshold T1=maximum. An edge is a contour of an image based on the density gradient of the image. If the density greatly changes in a short distance (pixels), the edge intensity is high. If the density slightly changes in a long distance (pixels), the edge intensity is low. In step S904, therefore, the CPU 401 sets a condition for the detection of an edge exhibiting a large density change and a narrow change range. Note that condition J1: edge intensity threshold T1 may be a single value or a value having a predetermined width.

In step S905, the CPU 401 gets the image processing unit 404 to perform an edge detection process for the dividable area of the image to be printed, and determines whether an edge matching the set condition J1 has been detected (S906). If the image processing unit 404 has not detected any edge matching the condition J1 in step S906, the CPU 401 decreases the edge intensity threshold T1 of the condition J1 for an edge detection process by an arbitrary step size in step S907. Upon changing the edge intensity threshold T1, the CPU 401 returns the process to step S905 to cause the image processing unit 404 to repeatedly perform an edge detection process until an edge matching the condition J1 is detected in step S906.

If the image processing unit 404 detects an edge matching the condition J1 in step S906, the CPU 401 gets a memory to store the edge in the image, which is detected by the image processing unit 404, and the intensity of the edge (S908). The CPU 401 sets, as the first dividing line, a line along the edge exhibiting the maximum edge intensity in the image (S909).

Figure 7E:
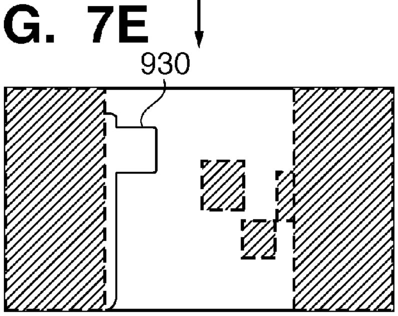
Figure 7F:
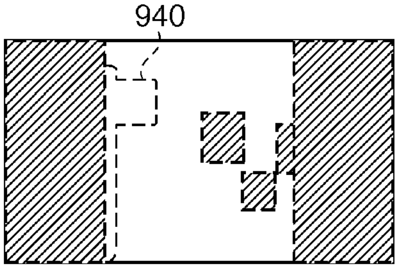

FIG. 7E exemplifies the image after an edge detection process is performed in step S905 for the dividable area of the image to be printed. FIG. 7F exemplifies the image to be printed after the first dividing line is set in step S909. As shown in FIG. 7E, in step S905, the image processing unit 404 detects an edge 930 matching the condition J1 in the dividable area. As shown in FIG. 7F, in step S909, the CPU 401 sets, as a first dividing line 940, one of the edges detected under the condition J1 which has the maximum intensity. In the case shown in FIG. 7F, the first dividing line 940 is set along a nameboard included in the dividable area.

The CPU 401 then determines in step S910 whether the set dividing line runs through the image to be printed in the short side direction of the image and the image to be printed can be divided along the dividing line. Upon determining in step S910 that the dividing line runs through the image, the CPU 401 makes the process advance to step S919. In the case shown in FIG. 7F, since the first dividing line 940 does not run through the image in the short side direction of the image, the CPU 401 determines that the image cannot be divided along the dividing line.

Upon determining in step S910 that the first dividing line 940 does not run through the image to be printed in the short side direction of the image, the CPU 401 sets a condition J2 for an edge detection process in step S911. In step S911, the CPU 401 sets the condition J2: edge intensity threshold T2=maximum. Note that condition J2: edge intensity threshold T2 can be a single value or a value having a predetermined width.

In step S912, the CPU 401 determines whether the condition J2 for the edge detection process: edge intensity threshold T2=0. Upon determining in step S912 that edge intensity threshold T2≠0, the CPU 401 gradually decreases condition J2 for edge detection process: edge intensity threshold T2 by an arbitrary step size at a time in step S913. Assume that in order to increase the edge detection accuracy, the step size of the edge intensity threshold T2 in step S913 is smaller than the step size of the edge intensity threshold T1 in step S907.

The CPU 401 then gets the image processing unit 404 to perform an edge detection process starting from an end of the dividing line in step S914, and determines whether an edge matching the condition J2 for the edge detection process is detected (S915). If no such edge is detected in step S915, the CPU 401 returns the process to step S912 to repeat steps S912, S913, S914, and S915 until condition J2 for edge detection process: edge intensity threshold T2=0.

Upon determining in step S915 that an edge is detected, the CPU 401 gets the memory to store the edge in the image and its intensity (S916). The CPU 401 then extends the dividing line using a combination of edges each exhibiting the maximum edge intensity starting from an end of the dividing line in step S917, and returns the process to the step S910. In the printing apparatus 400, therefore, the CPU 401 gets the image processing unit 404 to repeatedly perform an edge detection process while gradually decreasing the threshold for edge intensities in the edge detection process until the dividing line runs through the image in the short side direction. In this process, the dividing line is extended along the sequentially detected edges.

Upon determining in step S912 in a routine L1 that edge intensity threshold T2=0, the CPU 401 extends the dividing line using a line connecting the shortest distance until the line runs through the image from an end of the dividing line in the short side direction of the image in step S918. The process then advances to step S919. That is, in step S918, if the end of the dividing line set along an edge of an image does not reach a side of the image (a long side of the image), the CPU 401 extends and sets the dividing line such that the distance from the end to the long side of the image becomes the shortest distance.

Figure 7G:
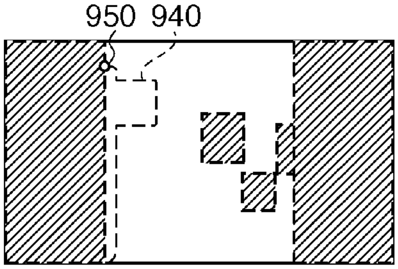
Figure 7H:
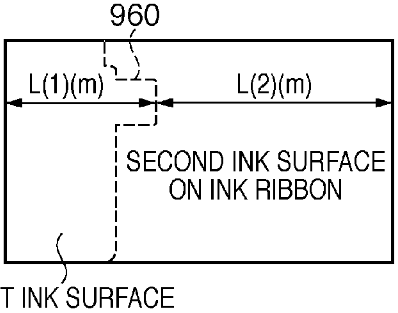

The processing in the routine L1 will be described with reference to FIG. 7G. As shown in FIG. 7G, the first dividing line 940 does not run through the image to be printed in the short side direction of the image. In the processing in the routine L1, the CPU 401 extends the dividing line starting from an end of the first dividing line 950 until determining YES in step S910 or S912. In the routine L1, therefore, the CPU 401 extends the dividing line so as to include the detected edge. More specifically, in the routine L1, the CPU 401 repeatedly performs an edge detection process while gradually decreasing the threshold for edge intensities and extends a dividing line so as to include the detected edge until the dividing line runs through the image in the short side direction. In addition, if the threshold for edge intensities decreases to 0, the dividing line is extended from the end of the dividing line to the long side of the image at the shortest distance. When the process reaches step S919 to be described later, the dividing line has run through the image in the short side direction, as indicated by a dividing line 960 in FIG. 7H.

Figure 8:
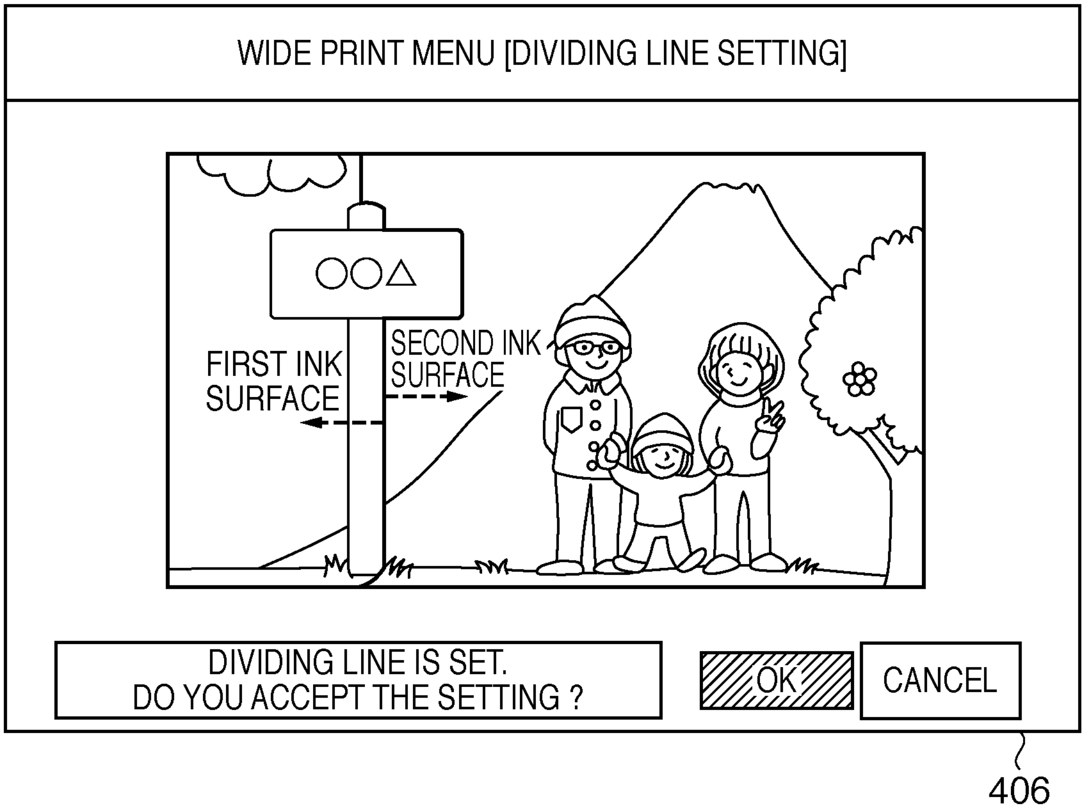
FIG. 8 is a view showing an example of display of a user interface when a dividing line is displayed and checked.

In step S919, the CPU 401 gets the display control unit 405 to display, on the LCD 406, the dividing line extended to run through the image in the short side direction as a graphical user interface. More specifically, as shown in FIG. 8, on the LCD 406, as a check window, the dividing line 960 is displayed while being superimposed on the image to be printed after the dividing line 960 is extended until it runs through the image in the short side direction so as to extend from one long side of the image to the other long side of the image. In step S920, the CPU 401 gets the operation control unit 412 to accept an instruction to continue or not to continue the processing with the displayed dividing line setting from the user via the operation key 413 or the operation button 414, and determines in accordance with the instruction whether to continue the processing.

Upon determining in step S920 that the processing is not to be continued with the displayed dividing line setting, and the operation control unit 412 accepts an instruction to re-set a dividing line from the user via the operation key 413 or the operation button 414 as an operation member to re-set a dividing line, the CPU 401 cancels the dividing line setting in step S921. Assume that the CPU 401 excludes the first dividing line set first from dividing line candidates in the following procedure, and inhibits the excluded dividing line from being re-set as the first dividing line until the end of the procedure shown in FIG. 6B (S922). The CPU 401 then returns the process to step S904. With this operation, upon accepting an instruction to re-set a dividing line from the user, the CPU 401 sets a new dividing line so as to include an edge different from that included by the set dividing line.

Upon determining in step S920 that the processing is to be continued with the displayed dividing line setting, the CPU 401 fixes the dividing line 960 in step S923. In step S924, the CPU 401 then sets the image on the left side of the dividing line 960 as the image to be formed by the first ink surface on the ink ribbon, and defines a length L(1)(m) of the mth line image data in the sub-scanning direction (the conveying direction of paper) in accordance with the dividing line 960. In addition, in step S925 the CPU 401 sets the image on the right side of the dividing line 960 as the image to be formed by the second ink surface on the ink ribbon, and defines a length L(2)(m) of the mth line image data in the sub-scanning direction in accordance with the dividing line 960. In step S926, the CPU 401 then gets the image processing unit 404 to divide the image data along the dividing line 960 as a boundary into image data in the first surface area (a divided image printing of the first ink surface) and image data in the second surface area (a divided image printing of the second ink surface). The CPU 401 then terminates the procedure in FIGS. 6A and 6B.

Figure 9:
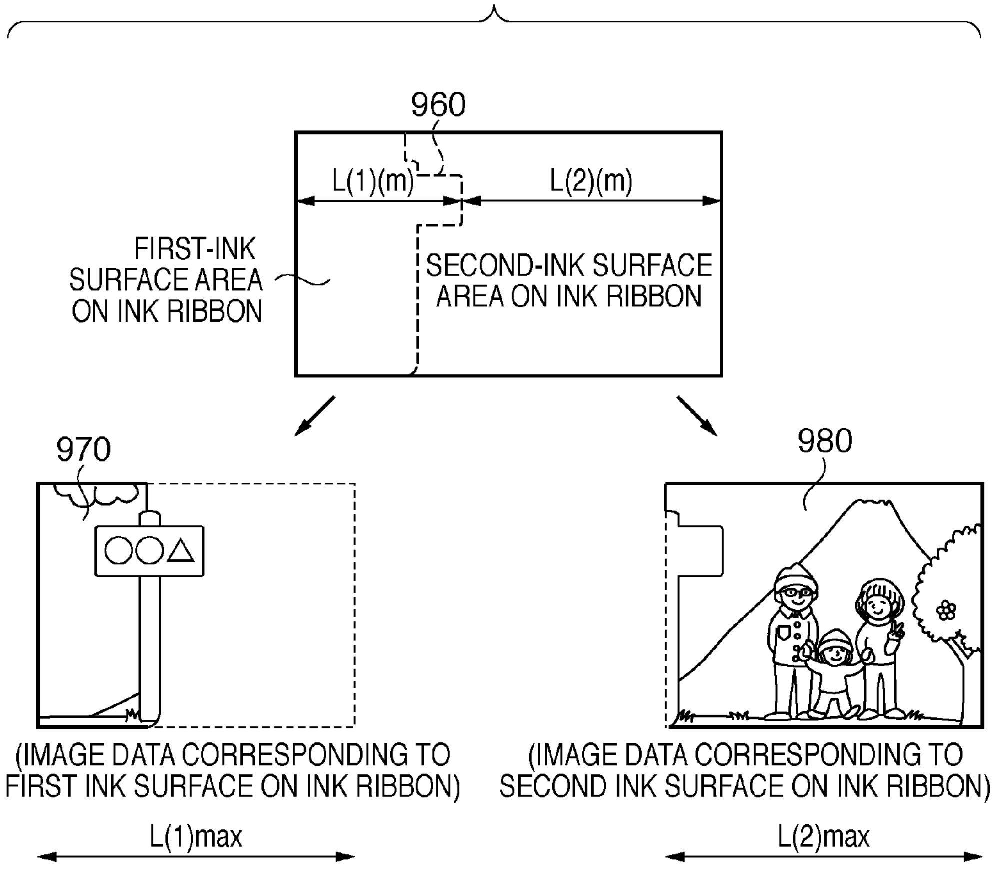
FIG. 9 is a conceptual view exemplifying how to divide an image to be printed into images to be printed by two ink surfaces on an ink ribbon along a dividing line.

FIG. 9 exemplifies how the image data is divided in step S926. As shown in FIG. 9, in step S926, the CPU 401 gets the image processing unit 404 to superimpose the first and second surface areas, which have already been defined, on the image data, and divides the image data into image data 970 for the first surface area and image data 980 for the second surface area. The image data after dividing operation are used such that the image data 970 on the left side of the dividing line 960 as a boundary is used for printing by the first ink surface on the ink ribbon, and the image data 980 on the right side is used for printing by the second ink surface on the ink ribbon. Therefore, the first ink surface on the ink ribbon is used to form the area of the image to be printed, which is located on the left side of the dividing line 960 as the boundary, in accordance with the image data 970. In addition, the second ink surface on the ink ribbon is used to form the area on the right side of the dividing line 960 in accordance with the image data 980.

Referring back to the procedure in FIG. 2, after the image dividing process in step S508, the CPU 401 defines a motor step combination P1 concerning the first surface area with the maximum value of the length L(1)(m) of the mth line image data in the sub-scanning direction being the maximum length in step S509. In step S510, the CPU 401 defines a motor step combination P2 concerning the second surface area with the maximum value of the length L(2)(m) of the mth line image data in the sub-scanning direction being the maximum length.

The CPU 401 then gets the printing control unit 415 to convey the paper to the start position of printing by the printing unit 416 using the first ink surface on the ink ribbon (S511). The CPU 401 also gets the image processing unit 404 to generate print data by converting the image data 970 into printable data (S512). The CPU 401 then gets the printing control unit 415 to print yellow, magenta, and cyan of the first ink surface on the paper based on the generated print data by using the printing unit 416 (S513, S514, and S515).

After printing of the image data using the first ink surface on the ink ribbon, the CPU 401 gets the printing control unit 415 to convey the paper to the start position of printing by the printing unit 416 using the second ink surface on the ink ribbon (S516). The CPU 401 then gets the image processing unit 404 to generate print data by converting the image data 980 into printable data (S517). The CPU 401 gets the printing control unit 415 to print yellow, magenta, cyan of the second ink surface on the paper based on the generated print data by using the printing unit 416 (S518, S519, and S520).

After printing of the image data using the second ink surface on the ink ribbon, the CPU 401 gets the printing control unit 415 to convey the paper to the start position of printing by the printing unit 416 using the first ink surface on the ink ribbon (S521), and to print an overcoat of the first ink surface on the paper (S522). The CPU 401 then gets the printing control unit 415 to convey the paper to the start position of printing by the printing unit 416 using the second ink surface on the ink ribbon (S523), and to print an overcoat of the second ink surface on the paper (S524).

Note that in overcoat printing in steps S521 to S524, the dividing line between the overcoat of the first ink surface area and the overcoat of the second ink surface area can have any shape as long as it satisfies the following condition. Note however that an overcoat area is defined to cover the print areas of yellow, magenta, and cyan of each ink surface. Condition: The dividing line between the overcoat of the first ink surface area and the overcoat of the second ink surface area exists in the dividable area Lx(1, 2) where L(1)max and L(2)max overlap.

That is, a dividing line for a print area concerning overcoat can divide it into the same areas as the print areas corresponding to the first surface image data 970 and the second surface image data 980, or can linearly divide the area in the dividable area Lx(1, 2). That is, a dividing line for a print area concerning overcoat may differ from dividing lines for print areas concerning yellow, magenta, and cyan as long as the above condition is satisfied.

Subsequently, the CPU 401 gets the printing control unit 415 to cut paper after printing by driving the cutting unit 154 which the printing unit 416 has (S525), and to deliver the cut paper (S526).

As described above, according to this embodiment, the printing apparatus 400 can perform the following printing when performing dividing print, that is, printing a plurality of number of times with the printable size of ink surface on an ink ribbon being an unit, on long paper longer than the printable size of ink surface in the long side direction.

It is possible to set a dividing position in an inconspicuous area so as to avoid face regions and halftone regions with low edge intensities when printing a plurality of number of times with the printable size of ink surface on an ink ribbon being a unit.

Figure 10:
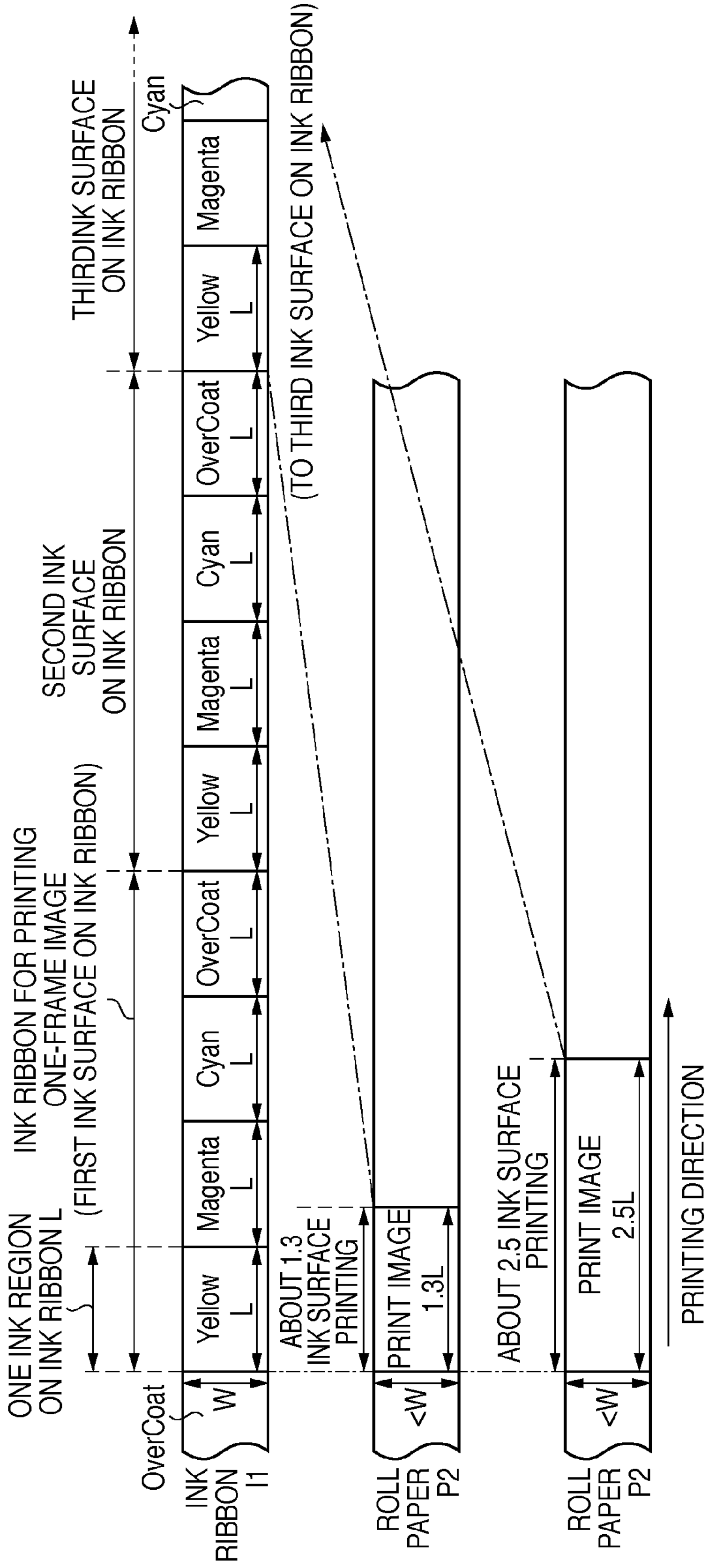
FIG. 10 is a conceptual view showing an example of how images having various aspect ratios are printed on long roll paper.

This embodiment has exemplified the printing process using two ink surfaces on an ink ribbon. As shown in FIG. 10, when a print result on roll paper P2 and an ink ribbon I1 are arranged side by side and compared with each other, it reveals that the print surface on the roll paper P2 has a size corresponding to the printable sizes of about 1.3 ink surfaces relative to the two ink surfaces on the ink ribbon I1. However, the printing process exemplified by this embodiment is an example, and the present invention is not limited to the use of only two ink surfaces on an ink ribbon. If an image to be printed is longer in the long side direction and the print surface on the roll paper P2 has a size corresponding to the printable sizes of about 2.5 ink surfaces, it is possible to print by using three ink surfaces on an ink ribbon, as exemplified by FIG. 10.

That is, it suffices if a dividing line is set on an image to be printed and the image is divided in the same manner as described in the procedure in FIGS. 6A and 6B, and printing is performed a plurality of number of times, with the printable size of ink surface on an ink ribbon being a unit, in the same manner as described in the procedure in FIG. 2. If, for example, an image to be printed on the roll paper P2 like that exemplified by FIG. 10 has a size corresponding to the printable sizes of about 2.5 ink surfaces, it is possible to perform the processing of obtaining a print result throughout three ink surfaces on the ink ribbon. That is, repeatedly performing the processing exemplified in this embodiment can print image data having a large aspect ratio in the long side direction until the paper or ink ribbon is fully consumed.

Other Embodiments

Note that the description of the above embodiment is an example, and the present invention is not limited to this. The arrangement and operation of the above embodiment can be changed as needed.

Although the thermal sublimation type printing apparatus has been exemplified as the printing apparatus according to the above embodiment, the printing apparatus of the present invention is not limited to the thermal sublimation type. For example, the present invention can be applied to any printing apparatuses using an ink ribbon on which ink surfaces each having a specified printable size are repeatedly formed.

In addition, this embodiment has exemplified the roll paper with no limitation in terms of length in the long side direction. However, the paper on which printing is performed is not limited to roll paper.

Figure 11:
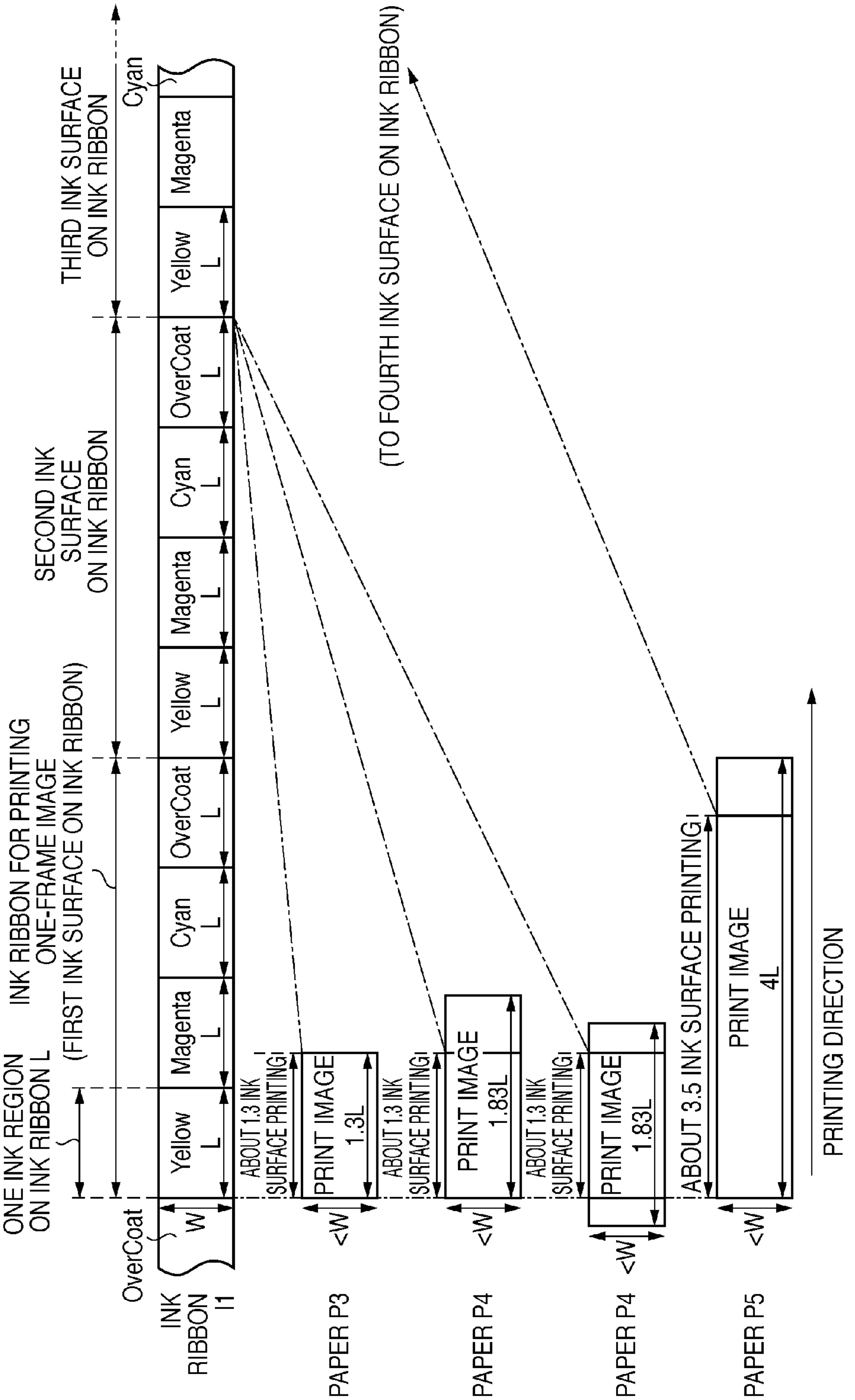
FIG. 11 is a conceptual view showing an example of how images having various aspect ratios are printed on sheets of paper having various aspect ratios.

As shown in FIG. 11, paper can have a length equal to or more than that of a print surface of an image to be printed, as described below:

For an image to be printed which corresponds to 1.3 ink surfaces, there are provided two ink surfaces on an ink ribbon I1, and paper P3 corresponding to 1.3 ink surfaces.

For an image to be printed which corresponds to 1.3 ink surfaces, there are provided two ink surfaces on the ink ribbon I1, and paper P4 corresponding to 1.83 ink surfaces. Note that the start position of printing of the image to be printed may fall within the paper P4 corresponding to 1.83 ink surfaces.

For an image to be printed which corresponds to 3.5 ink surfaces, there are provided four ink surfaces on the ink ribbon I1, and paper P5 corresponding to four ink surfaces.

Instead of setting an end of paper as the start position of printing in this manner, it is possible to match an end of paper with an end of an ink ribbon and start printing an image to be printed from a position corresponding to the start position of printing with the ink ribbon. In this case, paper having a size larger than that of an image to be printed is required, but the size is equal to or less than a paper size corresponding to the ink surface to be used.

Referring to FIG. 11, two ink surfaces on an ink ribbon is used for an image to be printed which corresponds to the printable sizes of 1.3 ink surfaces. It is however possible to use three ink surfaces on the ink ribbon depending on a dividing line (dividing position). In this case, however, the ink ribbon corresponding to three ink surfaces which is to be used includes a large area which is not used for printing. It is possible to provide an ink ribbon save mode. In the ink ribbon save mode, the number of ink surfaces required for printing an image to be printed is calculated based on the aspect ratio of the image to be printed and the aspect ratio of an area which can be printed with one ink surface on an ink ribbon. It is possible to restrict a dividing line so as not to perform dividing operation using ink surfaces equal to or more than the calculated number of ink surfaces and to select a dividing line within a range in which the number of ink surfaces required for printing does not increase. In this case, a dividing line may be restricted by the following method. That is, when the user designates a dividing line that increases the number of ink surfaces required for printing, a corresponding warning is displayed. Alternatively, the user may be inhibited from designating such a dividing line. In addition, when a dividing line is to be automatically calculated, it is possible to select a divided area at a position where the number of ink surfaces does not increase. Furthermore, if the number of ink surfaces calculated after the determination of a dividing line is not the minimum number of ink surfaces required for printing the image to be printed, it is possible to issue a warning prompting the user to select another dividing line.

This embodiment has exemplified the case in which the printing apparatus 400 sets a print image frame upon selecting image data, and sets an image to be printed by extracting the image data surrounded by the print image frame. However, setting of an image to be printed is not limited to the above setting. For example, it is possible to set selected image data as an image to be printed without any change instead of setting a print image frame upon selecting image data.

This embodiment has exemplified the ink ribbon having the following arrangement as the ink ribbon to be used:

The ink ribbon has four types of ink regions, namely ink regions of yellow, magenta, and cyan and an overcoat region for protecting paper after printing, which are repeatedly formed at a predetermined pitch.

Figure 12:
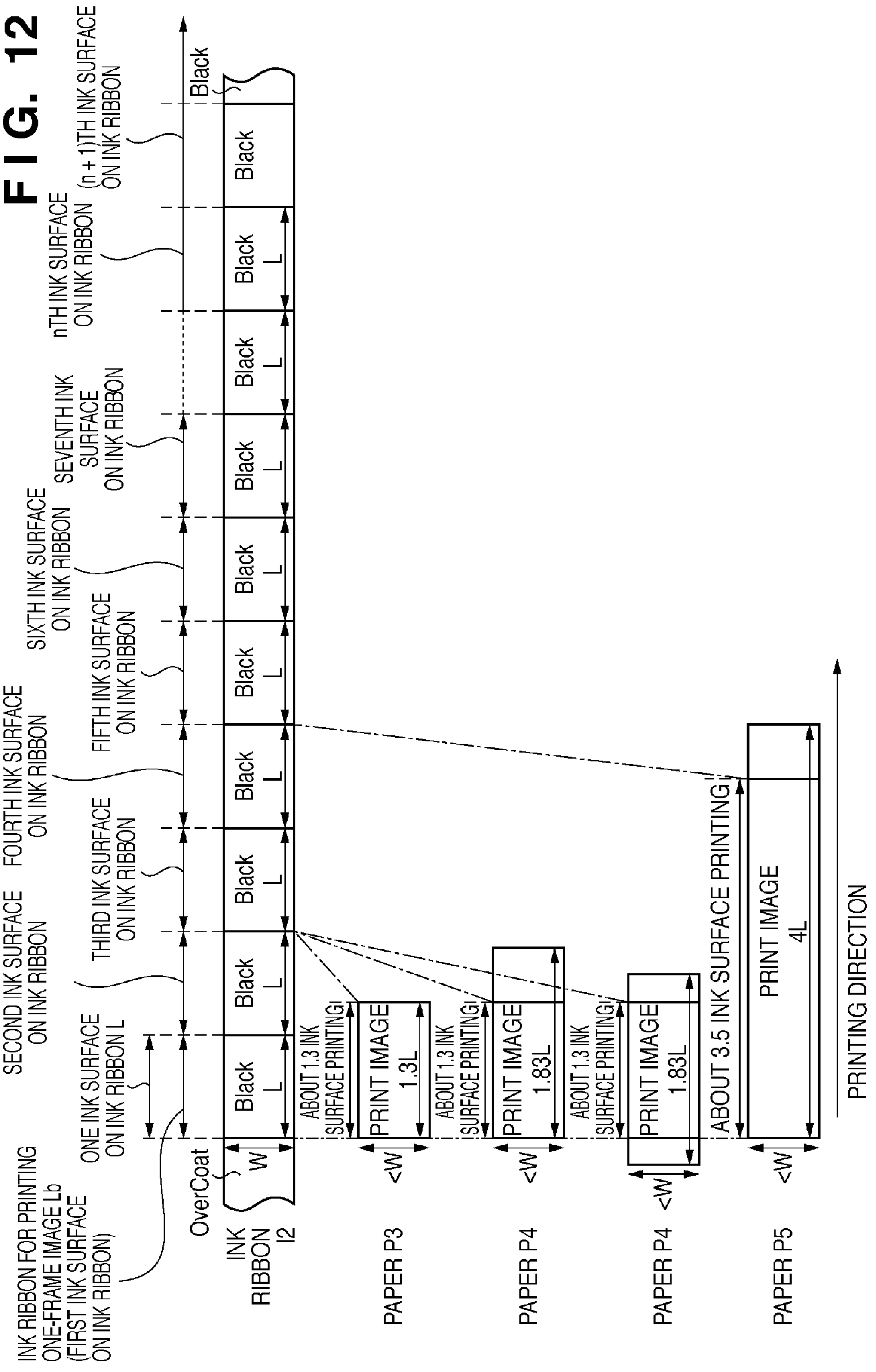
FIG. 12 is a conceptual view showing an example of how images having various aspect ratios are printed on sheets of paper having various aspect ratios by using a monochromatic ink ribbon.

However, the ink ribbon to be used is not limited to the one having the above arrangement. It is possible to use any ink ribbon on which ink surfaces, each having a printing pigment and a specified size, are repeatedly formed at a predetermined pitch. For example, as shown in FIG. 12, an ink ribbon I2 can be used, which has black (Black) ink regions repeatedly formed at a predetermined pitch to perform monochromatic print using one type of ink surfaces.

In addition, when performing a printing process for dividing print, this embodiment prints an overcoat region after completely printing with ink surfaces on an ink ribbon used for printing, with the printable size of each ink surface on the ink ribbon being a unit. However, the printing process to be used is not limited to the above printing sequence.

Figure 13:
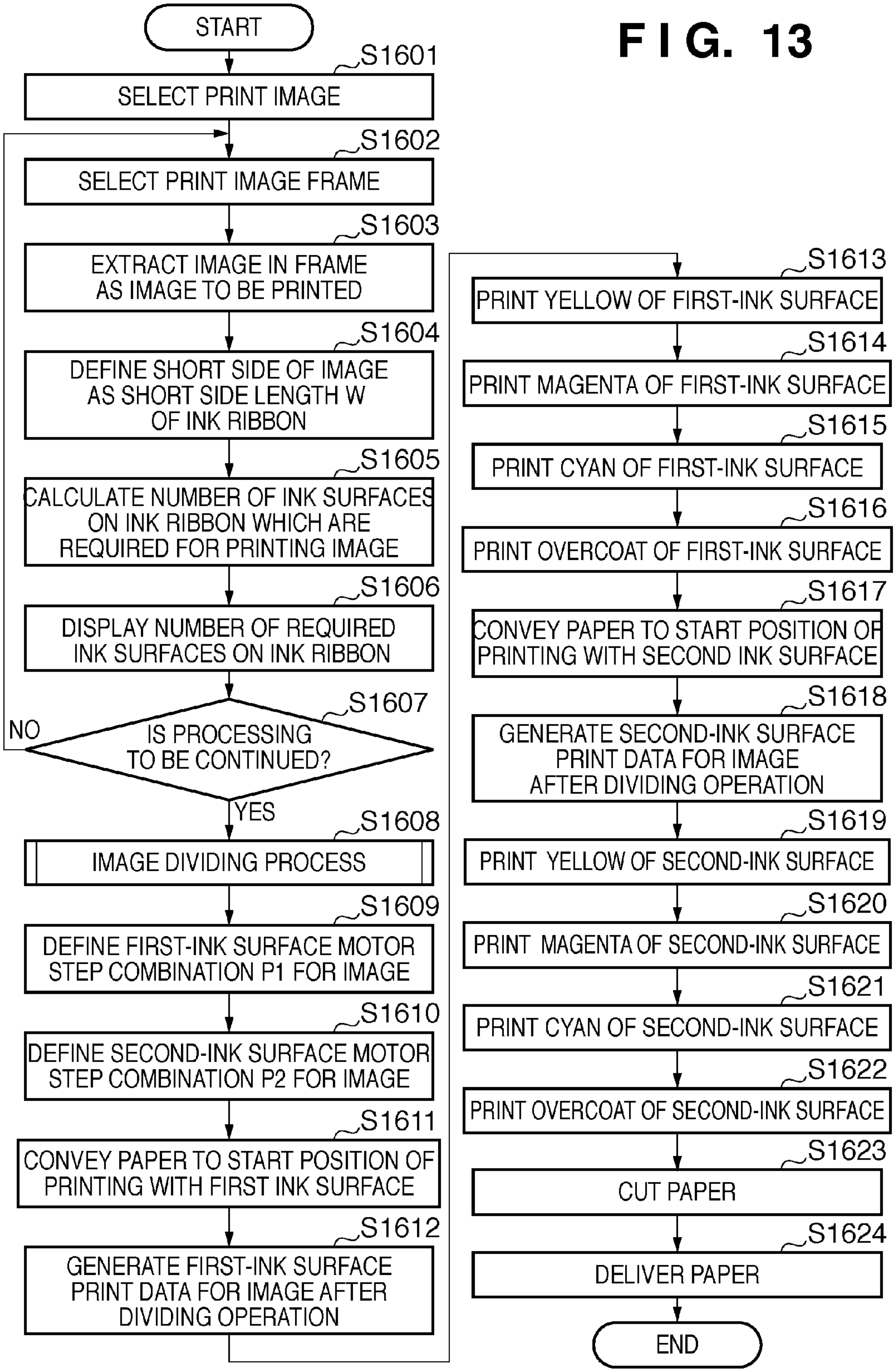
FIG. 13 is a flowchart showing a printing process in a printing apparatus according to another embodiment.

For example, after the ink regions of the nth ink surface on the ink ribbon are printed, the overcoat region of the nth ink surface can be printed. This operation can be repeated on a plurality of ink surfaces. More specifically, as indicated by the flowchart of FIG. 13, steps S1611 to S1616 are performed to print the ink regions and overcoat region of the first ink surface. In steps S1617 to S1622, the ink regions and overcoat region of the second ink surface are printed.

This embodiment has also exemplified the case in which a dividing line is set on an image to be printed by using the area where two ink surfaces, each having a printable size, on an ink ribbon overlap each other. However, the dividing line setting method to be used is not limited to this method. In the following description, assume that the aspect ratio of an image to be printed is not a size requiring two ink surfaces each having the printable size of an ink surface on an ink ribbon, but is a size requiring the nth to (n+3)th ink surfaces. In this case as well, letting W×L be the area of each print surface on an ink ribbon, the length of an image to be printed in the long side direction is converted into the length of a print surface on the ink ribbon in the long side direction. The following settings are made to prevent the formation of gaps from the two ends of the image to be printed in the long side direction and to prevent the nth ink surface and the (n+2)th ink surface, each having the printable size, from overlapping each other:

The maximum length of the nth ink surface on the ink ribbon is set as L(n)max, and the maximum length of the (n+1)th ink surface on the ink ribbon is set as L(n+1)max.

An area Lx(n, n+1) where L(n)max and L(n+1)max overlap is set as a dividable area, and the remaining areas are set as undividable areas.

Figure 14:
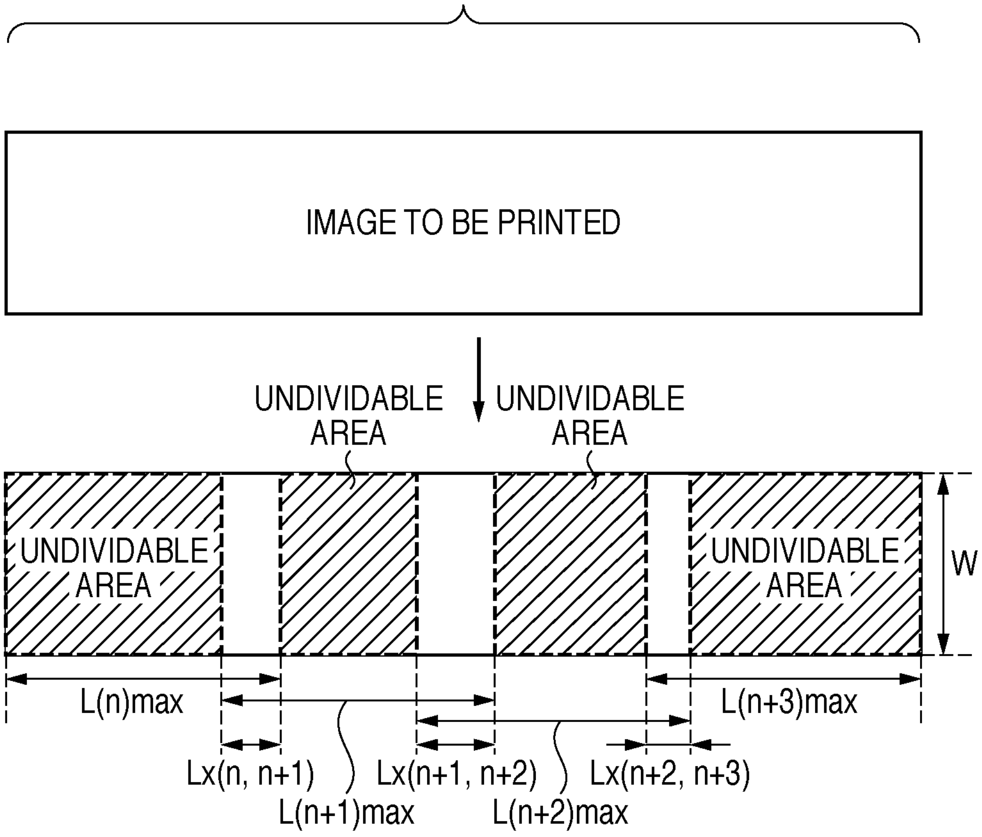
FIG. 14 is a conceptual view showing an example of how dividable and undividable areas are set when an image to be printed is printed by using the nth to (n+3)th ink surfaces on an ink ribbon.
Figure 15A:
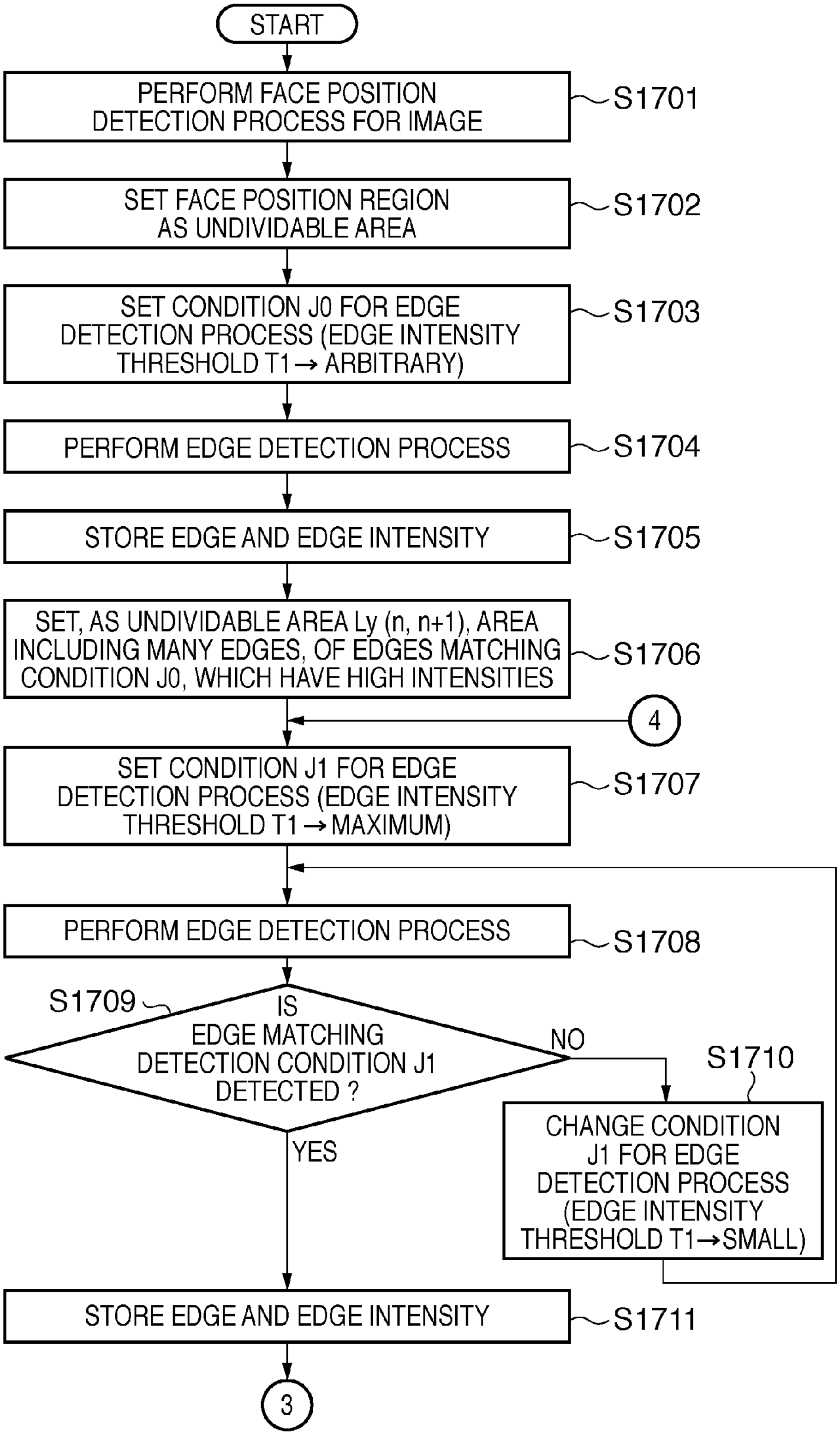
FIGS. 15A and 15B are flowcharts showing an image dividing process including the setting of dividable and undividable areas when printing an image to be printed by using the nth to (n+3)th ink surfaces on an ink ribbon.
Figure 15B:
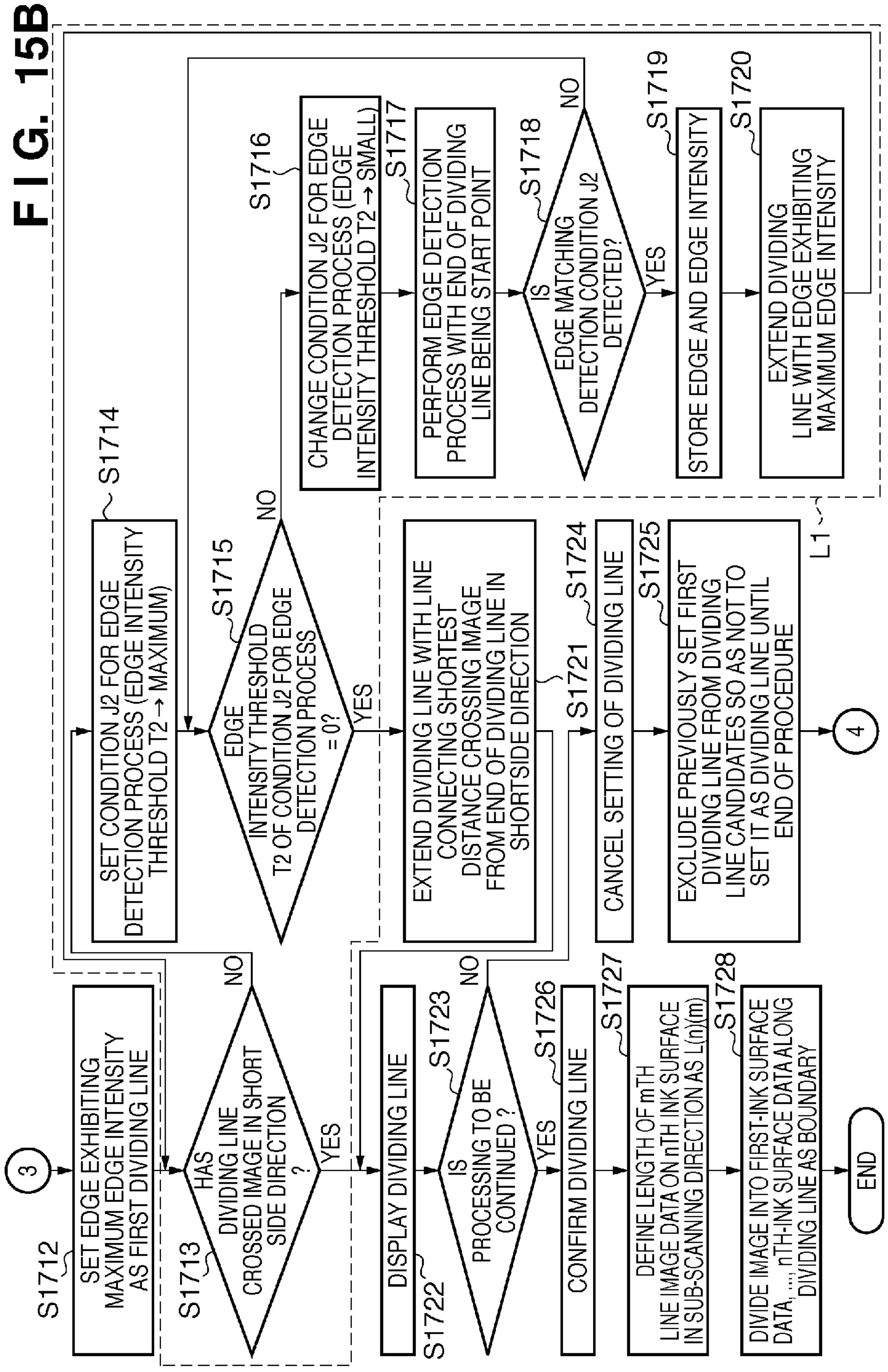

With the above settings, it is possible to set dividing lines on the image to be printed which corresponds to the first ink surface to the nth ink surface on the ink ribbon. More specifically, FIG. 14 shows an example of how dividable and undividable areas are set. FIGS. 15A and 15B show an example of an image dividing process including the setting of dividable and undividable areas.

As shown in FIG. 14, in setting dividable and undividable areas, the area Lx(n, n+1) where L(n)max and L(n+1)max overlap is set as a dividable area. In addition, an area Lx(n+1, n+2) where L(n+1)max and L(n+2)max overlap is set as a dividable area. Furthermore, an area Lx(n+2, n+3) where L(n+2)max and L(n+3)max overlap is set as a dividable area.

As shown in FIGS. 15A and 15B, an image dividing process including the setting of dividable and undividable areas is almost the same as the image dividing process exemplified in FIGS. 6A and 6B. A great difference from this process is that dividable areas are set in the following manner before the setting of the first dividing line. In step S1706, the CPU 401 sets, as a dividable area Ly(n, n+1), an area, of the image to be printed, which includes more edges exhibiting high edge intensities, and arranges the nth to (n+3)th ink surfaces on the ink ribbon. More specifically, in step S1706, the CPU 401 arranges L(n)max and L(n+3) on the two ends of the image to be printed in the case shown in FIG. 14. The CPU 401 then arranges the remaining areas L(n+1)max and L(n+2)max so as to set areas including many edges exhibiting high edge intensities as dividable areas. With this operation, an area including more edges exhibiting high edge intensities is set as a dividable area.

In addition, this embodiment has exemplified the case in which a dividing line on an image to be printed is set within the range of the dividable area Lx(1, 2) where two ink surfaces each having the printable size of an ink surface on an ink ribbon overlap each other. However, the dividing line setting method to be used is not limited to this method. For example, a dividable area can be re-set if it is difficult to set a dividing line in an inconspicuous area within the range of the dividable area Lx(1, 2), where two ink surfaces on the ink ribbon overlap, so as to avoid a face region and a halftone area exhibiting a low edge intensity.

More specifically, increasing the number of ink surfaces to be used on the ink ribbon by one will increase the degree of freedom in terms of the set position of a dividable area when setting a dividable area. This makes it possible to set a dividing line by re-setting a dividable area, other than the previously set area, where ink surfaces on the ink ribbon overlap. This setting operation can be applied regardless of the number of ink surfaces to be used on the ink ribbon.

Figure 16:
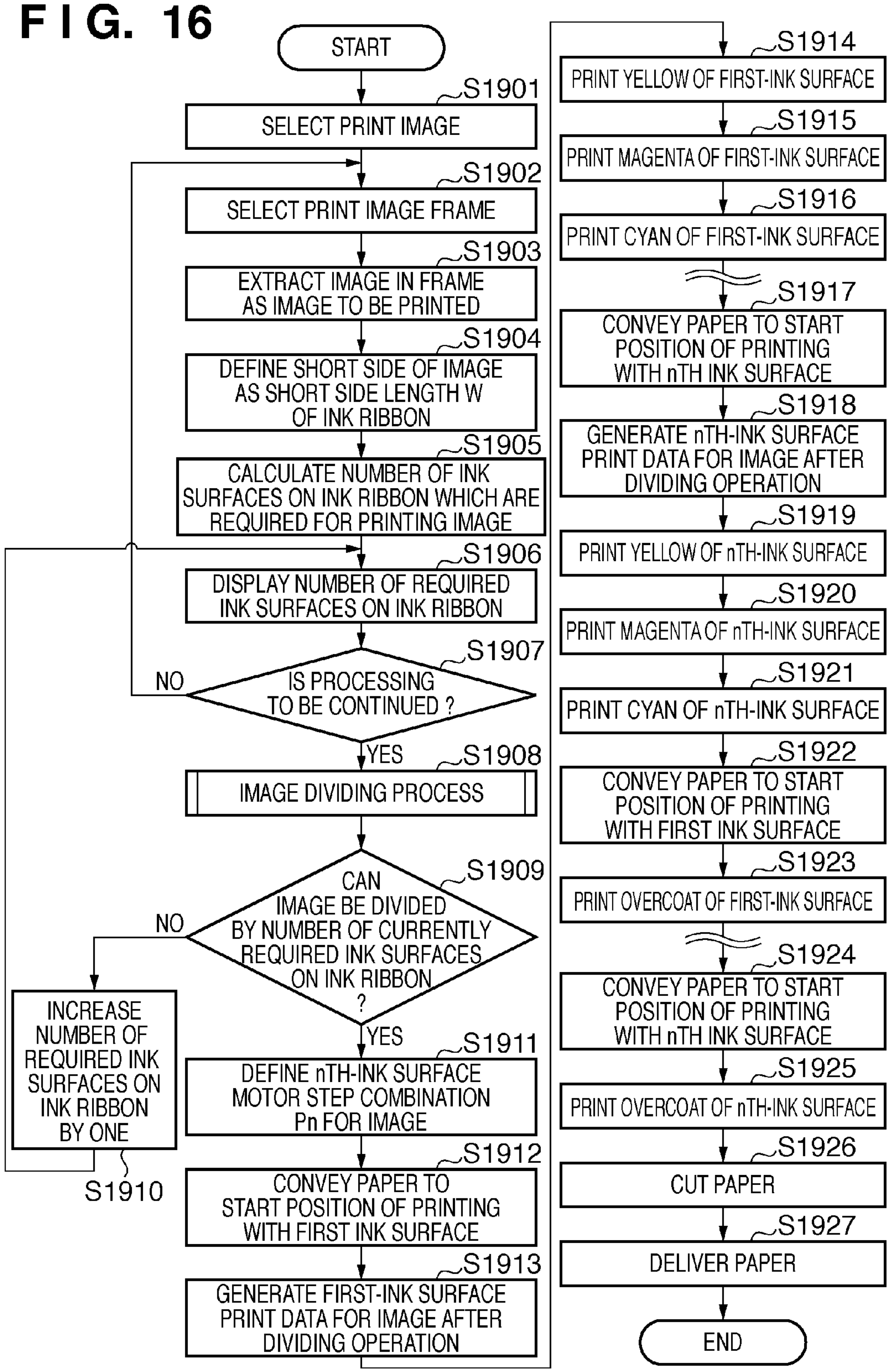
FIG. 16 is a flowchart showing a printing process which can increase the degree of freedom in setting a dividable area by increasing the number of ink surfaces to be used on an ink ribbon.
Figure 17A:
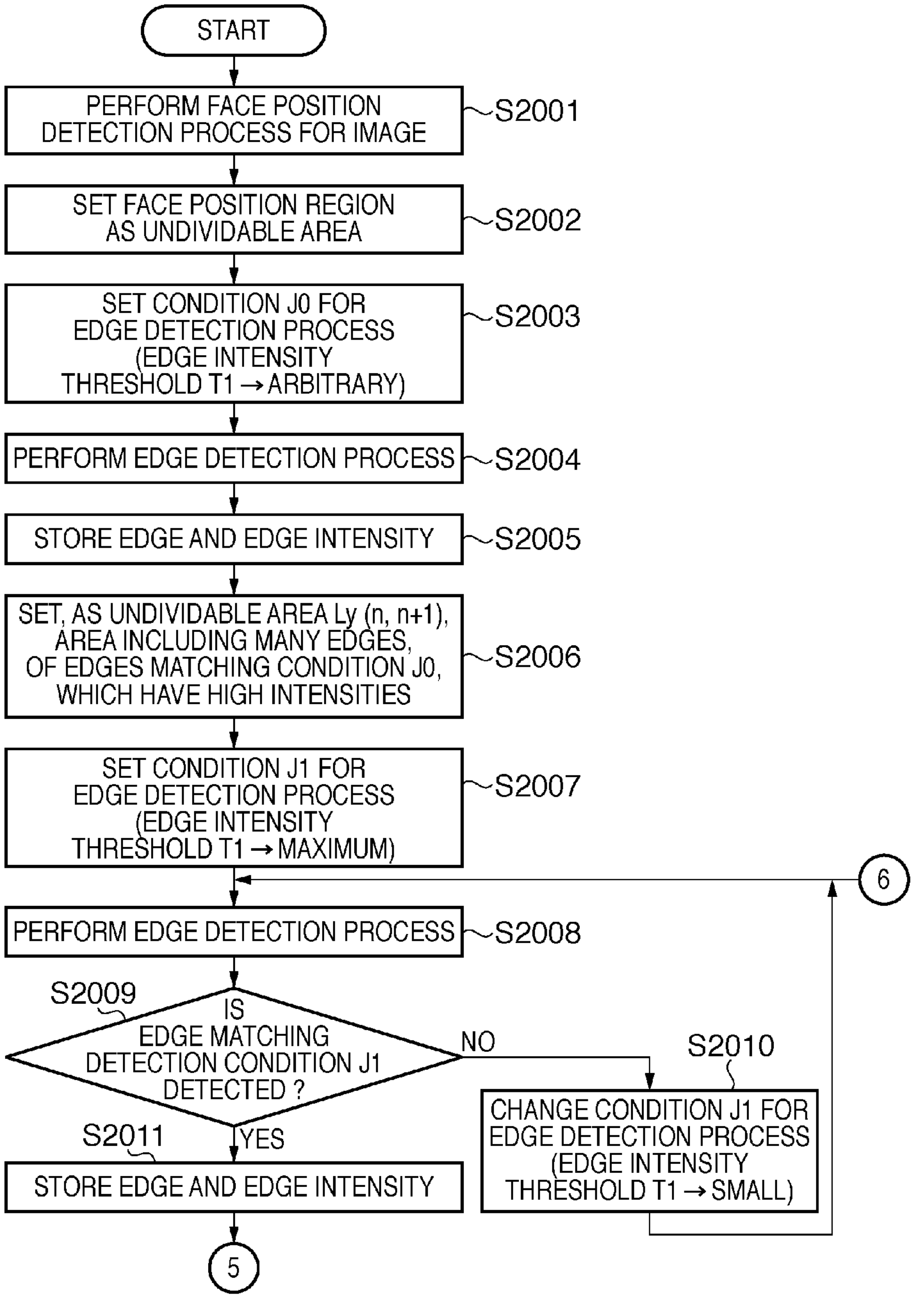
FIGS. 17A and 17B are flowcharts showing an image dividing process in a printing process which can increase the degree of freedom in setting a dividable area.
Figure 17B:
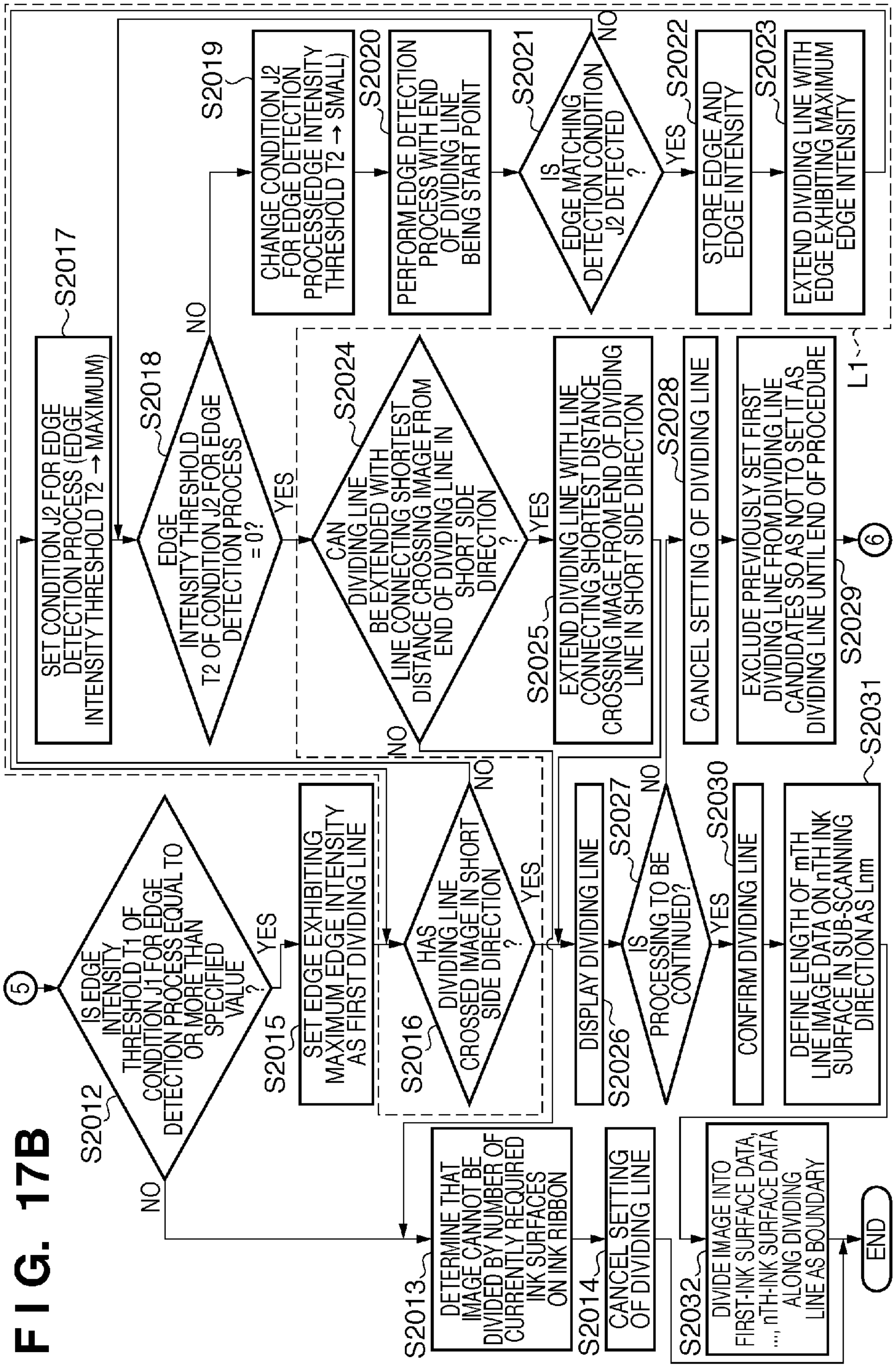

More specifically, FIG. 16 shows a printing process which allows to increase the degree of freedom in setting a dividable area by increasing the number of ink surfaces to be used on an ink ribbon. FIGS. 17A and 17B show an image dividing process including the setting of dividable and undividable areas in a printing process which allows to increase the degree of freedom in setting a dividable area. The following will describe only portions different from the printing process and image dividing process exemplified by FIGS. 2 and 6.

First of all, the image dividing process exemplified by FIGS. 17A and 17B differs from the process shown in the flowcharts of FIGS. 6A and 6B in that it includes the following decision steps and processes corresponding to them:

As shown in FIG. 17A, the CPU 401 determines in step S2012 whether the edge intensity threshold T1 of the condition J1 for an edge detection process is equal to or more than a preset specified value.

In addition, the CPU 401 determines in step S2024 whether a dividing line can be extended by a line connecting the shortest distance from an end of the dividing line to a point at which the line runs through the image in the short side direction. If, for example, the line connecting the shortest distance runs through a face region or a halftone area exhibiting a low edge intensity, the CPU 401 determines that the dividing line cannot be extended.

If NO in step S2012 or S2024, the CPU 401 determines in step S2013 that it is impossible to divide the image by the number of currently required ink surfaces on the ink ribbon, and cancels the setting of the dividing line (S2014). The CPU 401 then terminates the image dividing process.

In addition, the printing process exemplified in FIG. 16 differs from the process in the flowchart of FIG. 2 in that it includes the following decision steps and processes corresponding to them:

As shown in FIG. 16, the CPU 401 determines in step S1909 whether it is possible to divide an image by the number of currently required ink surfaces on the ink ribbon. More specifically, the CPU 401 determines in step S1909 whether it is possible to divide an image in step S2013 in the previously performed image dividing process.

Upon determining in step S1909 that the image cannot be divided, the CPU 401 increases the number of required ink surfaces on the ink ribbon by one in step S1910, and returns the process to step S1906.

With the above processing, since the number of ink surfaces to be used on the ink ribbon is increased by one, it is possible to increase the degree of freedom in terms of set position when setting a dividable area. Even if, therefore, it is difficult to set a dividing line in an inconspicuous area so as to avoid a face region and a halftone area exhibiting a low edge intensity, it is possible to re-set a dividable area and set a dividing line in a proper dividable area.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-035811, filed Feb. 18, 2009, which is hereby incorporated by reference herein in its entirety.

What is claimed is:

1. A printing apparatus comprising:

a printing unit configured to print an image on a print medium using at least one set of color inks, wherein a set of color inks includes a plurality of color inks and the set of color inks is repeatedly arranged on an ink ribbon;

a determination unit configured to, in a case where one print image is printed by using a plurality of sets of color inks, determine an area in the print image, which is printed by one set of color inks, by dividing the print image to a size not larger than the printable size of one set of color inks;

a control unit configured to control the printing unit to print the print image by using the plurality of sets of color inks based on the area determined by the determination unit; and a calculation unit which calculates a minimum number of set of color inks, which are required for printing the print image, wherein the determination unit divides the print image into areas corresponding to the minimum number of sets of color inks which are required for printing the print image.

2. The printing apparatus according to claim 1, further comprising a first edge detection unit that detects an edge in the print image, wherein the determination unit determines a dividing line which divides the print image, based on an edge detected by the first edge detection unit.

3. The printing apparatus according to claim 2, further comprising a dividable area determination unit that determines a dividable area, which the determination unit is able to divide, when the print image is divided, based on a size of the print image and the printable size of one set of color inks, wherein the determination unit determines a dividing line dividing the print image in the dividable area determined by the dividable area determination unit.

4. The printing apparatus according to claim 3, wherein the determination unit is configured to change the dividable area in accordance with an instruction from a user, and the dividable area in the print image is configured to be changed within a range in which the number of sets of color inks which are required for printing one image does not increase.

5. The printing apparatus according to claim 4, wherein the determination unit determines a range in which the dividable area is configured to be changed, based on an aspect ratio of the print image and an aspect ratio of an area which one set of color inks is able to print.

6. The printing apparatus according to claim 3, wherein the first edge detection unit detects an edge, of edges of an image included in the dividable area, whose edge intensity satisfies a preset threshold, and the determination unit determines the dividing line by further using an edge detected after the threshold is gradually decreased, when the determination unit is not able to determine a dividing line for dividing the print image by the edge which satisfies the threshold.

7. The printing apparatus according to claim 2, wherein the determination unit determines the dividing line such that the dividing line for dividing the print image includes the edge of the image which is detected by the first edge detection unit and is minimized.

8. The printing apparatus according to claim 2, further comprising a dividable area determination unit that determines a dividable area, which the determination unit is able to divide when the print image is divided, based on a size of the print image and the printable size of one set of color inks, wherein the first edge detection unit detects an edge, of edges of an image included in the dividable area, whose edge intensity satisfies a preset threshold, and the determination unit determines the dividable area again, when the first edge detection unit is not able to detect an edge which satisfies the threshold or when an end of a dividing line for dividing the print image, which is determined to include the edge of the image detected by the first edge detection unit, does not reach an edge of the print image.

9. The printing apparatus according to claim 2, further comprising a display unit which displays the dividing line, determined by the determination unit for dividing the print image, on the print image.

10. The printing apparatus according to claim 1, further comprising a face region detection unit that detects a face region including a face of a person from an image, wherein the determination unit determines a dividing line, which divides the print image, so as to avoid the face region on the print image which is detected by the face region detection unit.

11. A printing apparatus comprising:

a printing unit configured to print a print image on a print medium using at least one set of color inks, the set of color inks includes a plurality of color inks and the set of color inks is repeatedly arranged on an ink ribbon;

a display control unit configured to, in case where one print image is printed by using a plurality of sets of color inks, display on a display unit, each area in the print image to be printed by one set of color inks;

a changing unit configured to change each area in the print image displayed on the display unit in accordance with an operation input to an operation member; and a control unit configured to control the printing unit to print one print image by using the plurality of sets of color inks based on each area in the print image which is changed by the changing unit.

12. A printing control method of a printing apparatus comprising the steps of:

printing a print image on a print medium using at least one set of color inks, wherein the set of color inks includes a plurality of color inks and the set of color inks is repeatedly arranged on an ink ribbon;

in a case where one print image is printed by using a plurality of sets of color inks, determining an area in the print image, which is printed by one set of color inks, by dividing the print image to a size not more than one set of color inks;

controlling the printing apparatus to print the print image by using the plurality of sets of color inks based on the area determined in the step of determining; and calculating a minimum number of sets of color inks, which are required for printing the print image, wherein in the step of determining, the print image is divided into areas corresponding to the minimum number of sets of color inks which are required for printing the print image.

13. A printing control method of a printing apparatus comprising the steps of:

printing a print image on a print medium using at least one set of color inks, the set of color inks includes a plurality of color inks and the set of color inks is repeatedly arranged on an ink ribbon;

in case where one print image is printed by using a plurality of sets of color inks, displaying on a display unit, each area in the print image to be printed by one set of color inks;

changing each area in the print image displayed on the display unit in accordance with an operation input to an operation member; and controlling the printing apparatus to print one print image by using the plurality of sets of color inks based on each area in the print image which is changed in the step of changing.

14. A non-transitory computer-readable recording medium storing a program for causing a computer to execute the printing control method defined in claim 13.

15. A non-transitory computer-readable recording medium storing a program for causing a computer to execute the printing control method defined in claim 13.

* * * * *